(12) United States Patent
Wong et al.

(10) Patent No.: US 10,328,541 B2
(45) Date of Patent: Jun. 25, 2019

(54) ACCESSORY FOR AN ELECTRIC POWER TOOL

(71) Applicant: TECHTRONIC POWER TOOLS TECHNOLOGY LIMITED, Tortola (VG)

(72) Inventors: Tsz Kin Wong, Hong Kong (CN); Kwok Ting Mok, Hong Kong (CN)

(73) Assignee: TECHTRONIC POWER TOOLS TECHNOLOGY LIMITED, Tortola (VG)

( * ) Notice: Subject to any disclaimer, the term of this patent is extended or adjusted under 35 U.S.C. 154(b) by 568 days.

(21) Appl. No.: 15/030,992

(22) PCT Filed: Apr. 8, 2014

(86) PCT No.: PCT/CN2014/074888
§ 371 (c)(1),
(2) Date: Apr. 21, 2016

(87) PCT Pub. No.: WO2015/058496
PCT Pub. Date: Apr. 30, 2015

(65) Prior Publication Data
US 2016/0250731 A1    Sep. 1, 2016

(30) Foreign Application Priority Data
Oct. 21, 2013    (HK) .................... 13111799

(51) Int. Cl.
*B23Q 11/00*    (2006.01)
*B25F 5/00*     (2006.01)
*B25F 5/02*     (2006.01)

(52) U.S. Cl.
CPC .......... *B23Q 11/0071* (2013.01); *B25F 5/003* (2013.01); *B25F 5/026* (2013.01); *B23Q 11/0046* (2013.01)

(58) Field of Classification Search
CPC ... B23Q 11/00; B23Q 11/0046; B23Q 11/006; B23Q 11/0071; B23Q 16/001;
(Continued)

(56) References Cited

U.S. PATENT DOCUMENTS 2,082,418 A * 6/1937 Palmer .................. E21B 21/015
                                                          125/11.22
2,483,060 A * 9/1949 Niedelman .......... B25H 1/0078
                                                          33/501
(Continued)

FOREIGN PATENT DOCUMENTS

CN    2251618    4/1997
CN    201161374    12/2008
(Continued)

OTHER PUBLICATIONS

European Search Report for Application No. 14856255.6 dated Aug. 16, 2017 (1 page).
(Continued)

*Primary Examiner* — Scott A Smith
(74) *Attorney, Agent, or Firm* — Michael Best & Friedrich LLP

(57) ABSTRACT

An accessory (100, 200, 600, 700) for an electric drill (112, 612) is disclosed as including a dust box (118, 218, 618, 702) for receiving abraded materials produced by an electric drill on a workpiece, the dust box including an internal cavity, a first longitudinal end (116, 216, 616) with a first opening (130a, 632a) communicating with the internal cavity, an opposite second longitudinal end with a second opening (120a, 618a) communicating with the internal cavity, and a brush (128) or a disc (628), and when a drill bit (114, 614) of the electric drill is received into the internal cavity of the dust box through the second opening, the brush or disc is
(Continued)

releasably engageable with the drill bit for simultaneous rotational movement about a longitudinal axis of the drill bit.

5 Claims, 30 Drawing Sheets

(58) Field of Classification Search
CPC ....... B23B 47/34; B23B 49/006; B25F 5/003; B25F 5/00; B25F 5/026; Y10T 408/44; Y10T 408/50; Y10T 408/98; Y10T 408/99; Y10T 408/453; Y10T 408/564
USPC ............. 173/29, 213, 217, 21, 75, 198, 171; 408/56, 67, 110, 112, 113; 175/209, 213; 451/453, 456
See application file for complete search history.

(56) References Cited

U.S. PATENT DOCUMENTS

| | | | | |
|---|---|---|---|---|
| 3,850,254 A * | 11/1974 | Hirdes | ............... | B23Q 11/0046 173/75 |
| 4,064,952 A * | 12/1977 | Lechner | ............... | B23Q 11/006 137/43 |
| 4,097,176 A * | 6/1978 | Wanner | ............... | B23Q 1/0036 175/213 |
| 4,205,728 A * | 6/1980 | Gloor | ................. | B23Q 11/0046 175/209 |
| 4,207,953 A | 6/1980 | Reibetanz et al. | | |
| 4,250,971 A * | 2/1981 | Reibetanz | ............ | B23B 49/006 173/21 |
| 4,921,375 A * | 5/1990 | Famulari | ............ | B23Q 11/0046 144/252.1 |
| 5,090,499 A * | 2/1992 | Cuneo | ................ | B23Q 11/0046 173/75 |
| 5,129,467 A * | 7/1992 | Watanabe | ........... | B23Q 11/0046 173/217 |
| 5,356,245 A * | 10/1994 | Hosoi | .................... | B08B 15/04 408/56 |
| 5,465,492 A * | 11/1995 | Bond | ...................... | B25F 5/003 33/275 R |
| 5,688,082 A * | 11/1997 | Richardson | ........ | B23Q 11/0046 408/113 |
| 6,887,146 B2 * | 5/2005 | Staas | .................. | B23Q 11/0046 144/252.1 |
| 7,281,886 B2 * | 10/2007 | Stoerig | ............. | B23Q 11/0046 175/213 |
| 7,425,109 B2 * | 9/2008 | Simm | ................ | B23Q 11/0046 173/198 |
| 7,905,260 B2 * | 3/2011 | Keenan | ............. | B23Q 11/0046 144/252.1 |
| 8,967,923 B2 * | 3/2015 | Lerch | ................. | B23Q 11/0071 408/67 |
| 9,056,379 B2 * | 6/2015 | Yoshikane | ......... | B23Q 11/0046 |
| 9,776,296 B2 * | 10/2017 | Brewster | ................ | B23Q 11/00 |
| 2002/0141836 A1 * | 10/2002 | Ege | .................... | B23Q 11/0046 408/67 |
| 2004/0192184 A1 | 9/2004 | Staas et al. | | |
| 2006/0153650 A1 | 7/2006 | Simm et al. | | |

FOREIGN PATENT DOCUMENTS

| | | |
|---|---|---|
| CN | 202951692 | 5/2013 |
| EP | 1964649 | 9/2008 |
| WO | 9852723 | 11/1998 |
| WO | 2011072921 | 6/2011 |

OTHER PUBLICATIONS

International Search Report for Application No. PCT/CN2014/074888 dated Jul. 21, 2014 (4 pages).

* cited by examiner

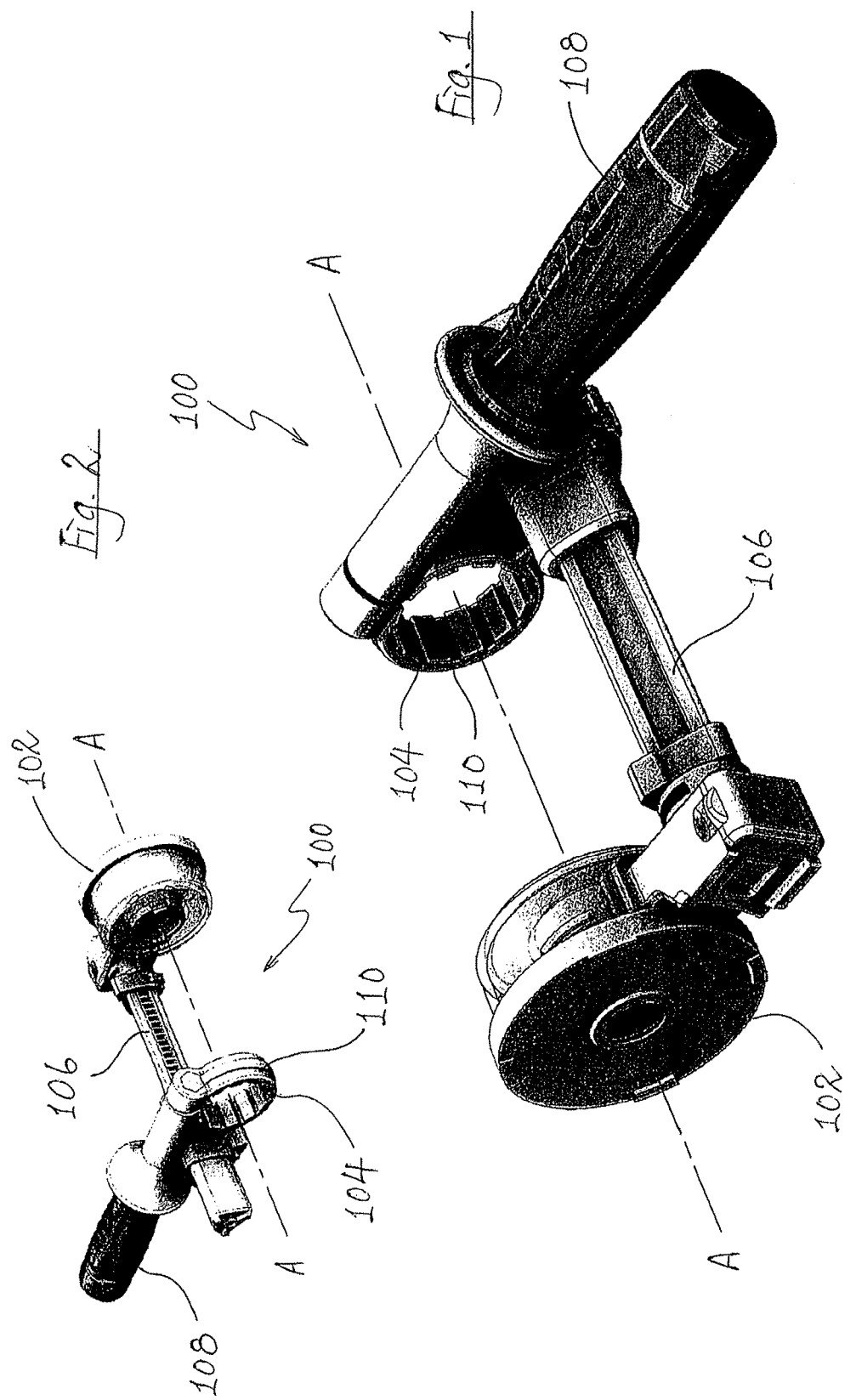

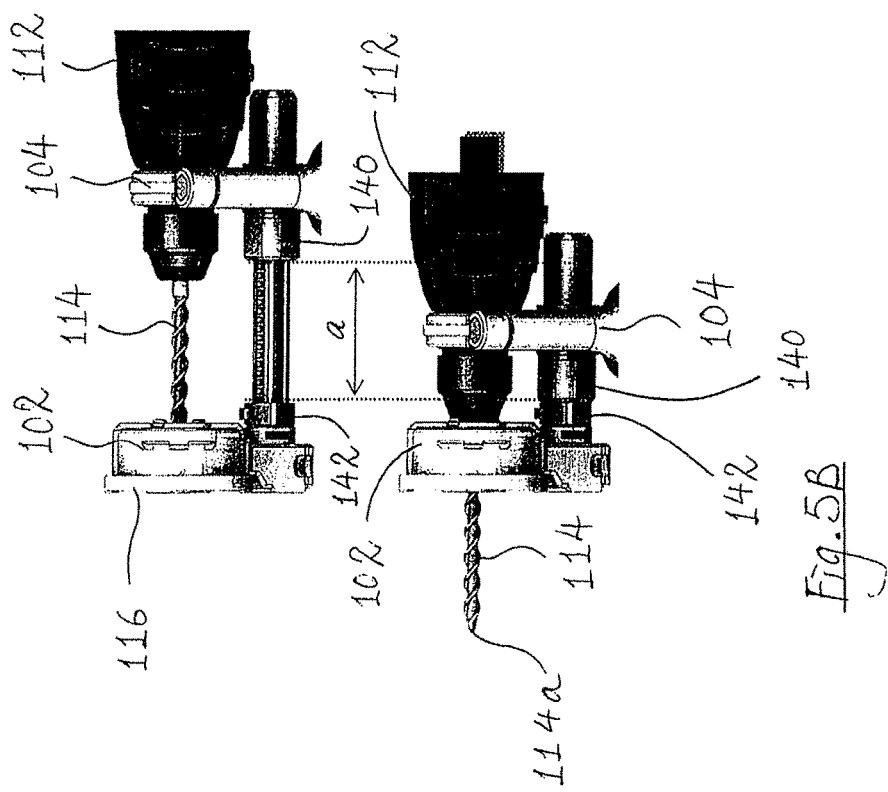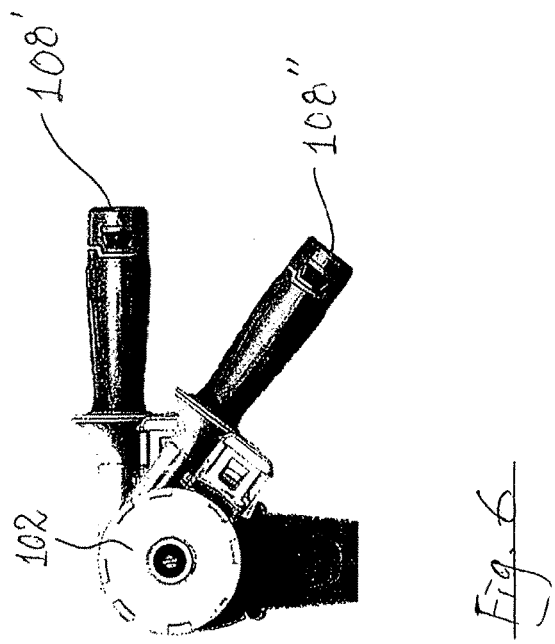

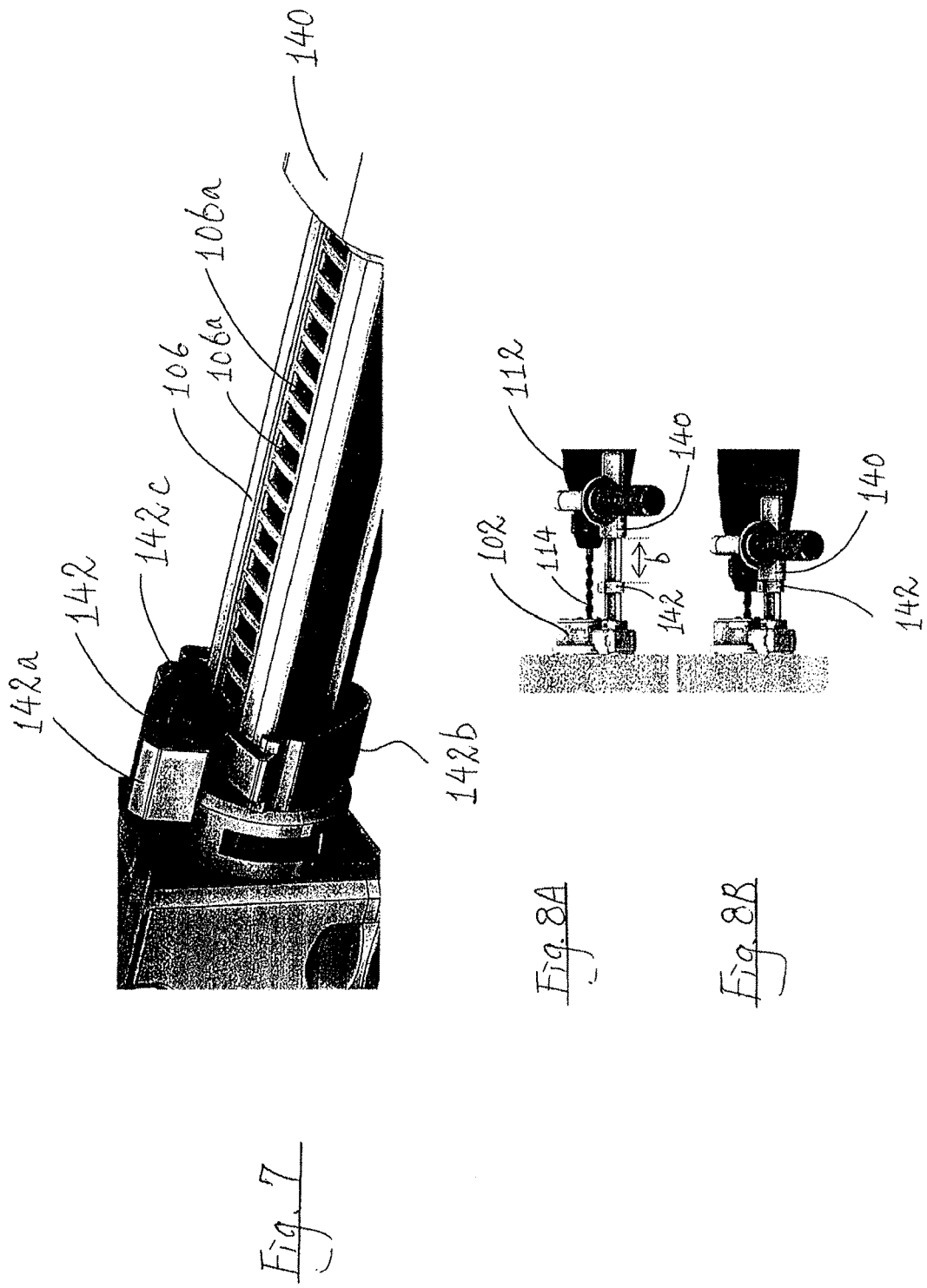

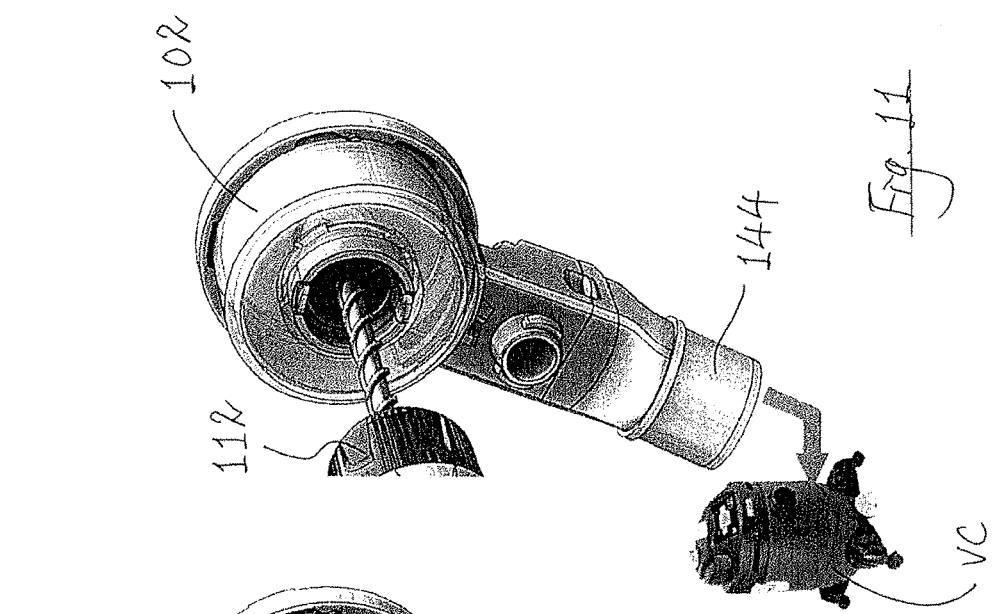
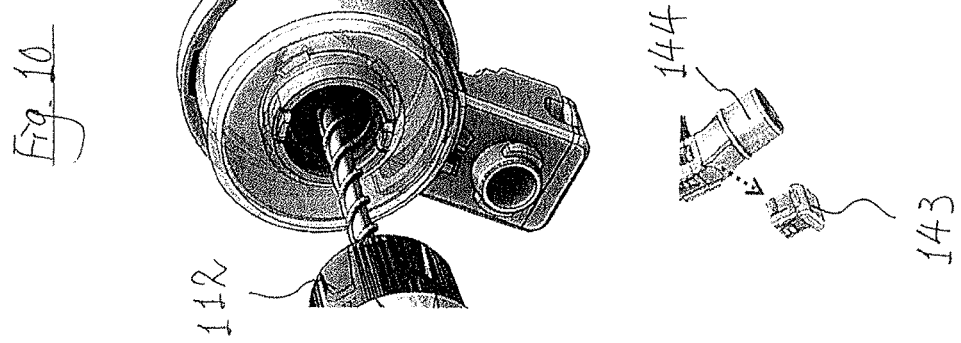
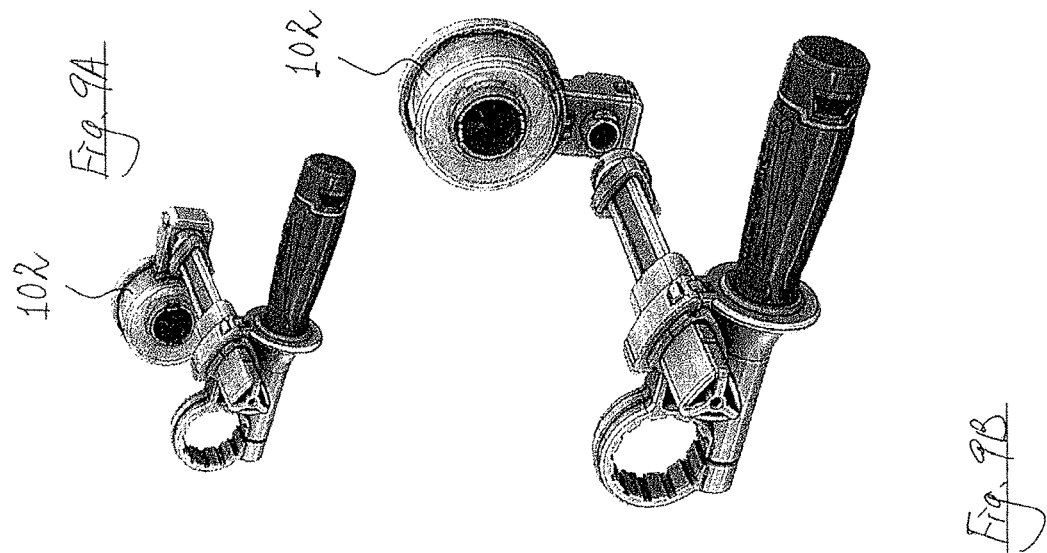

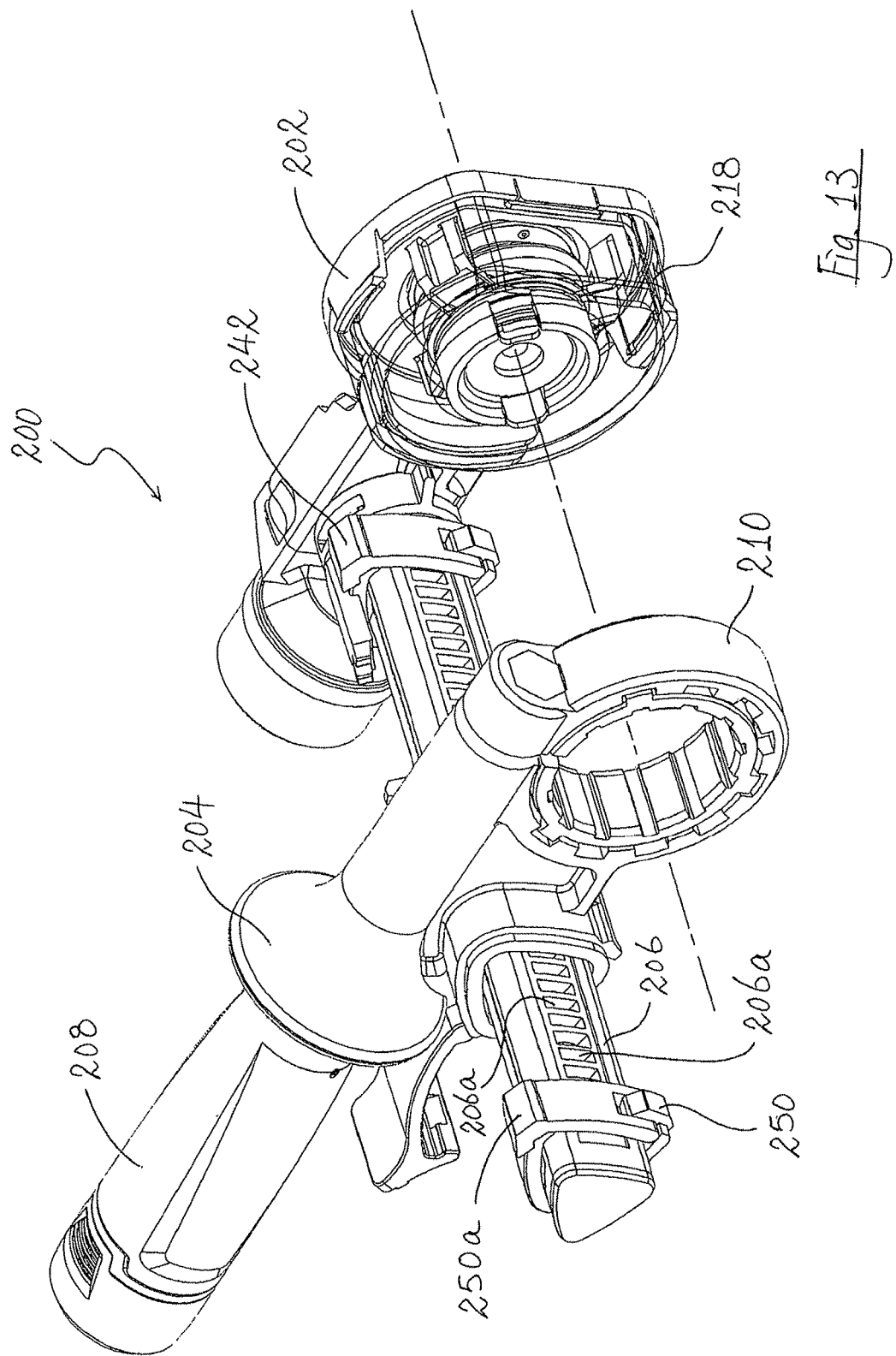

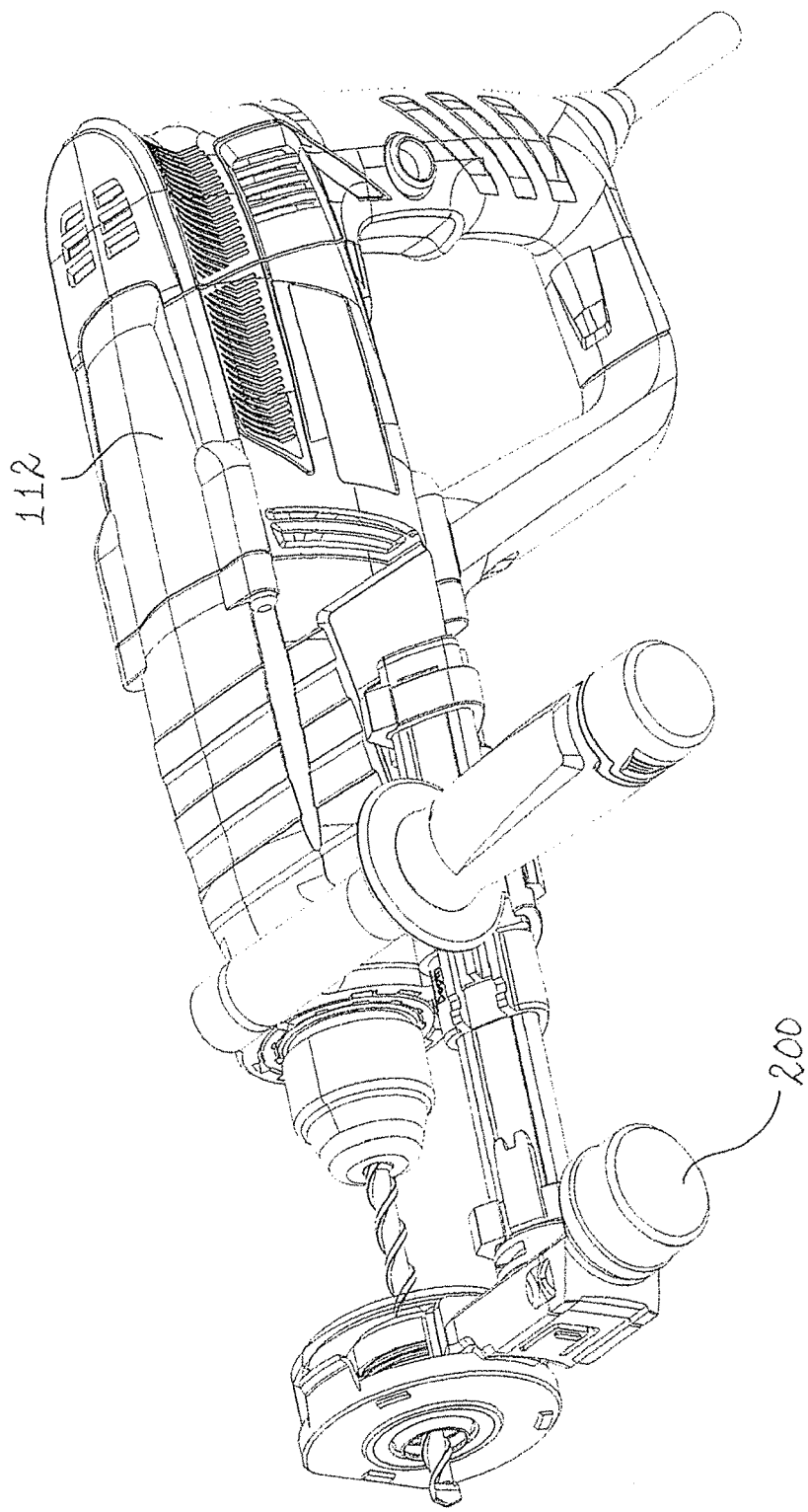

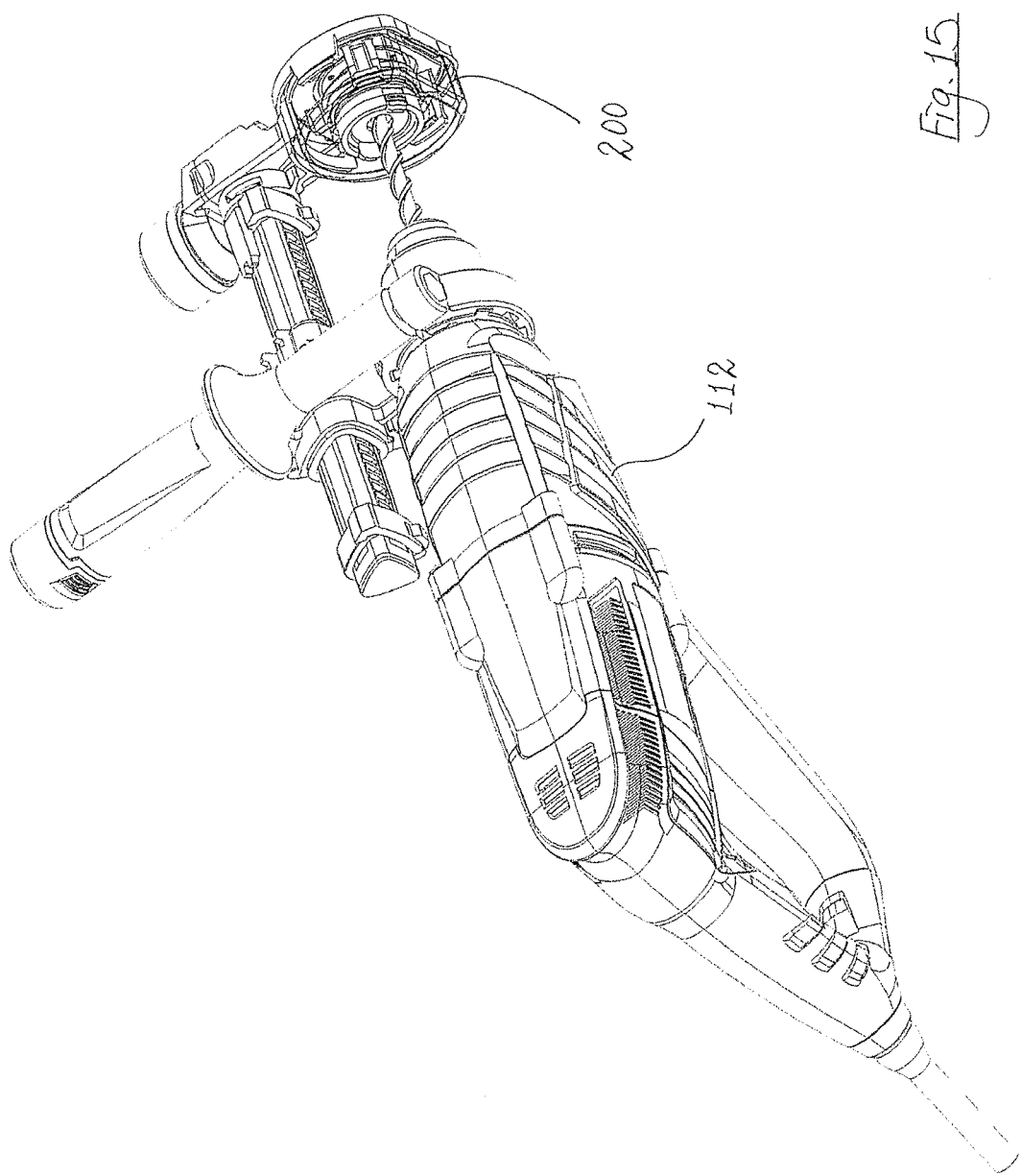

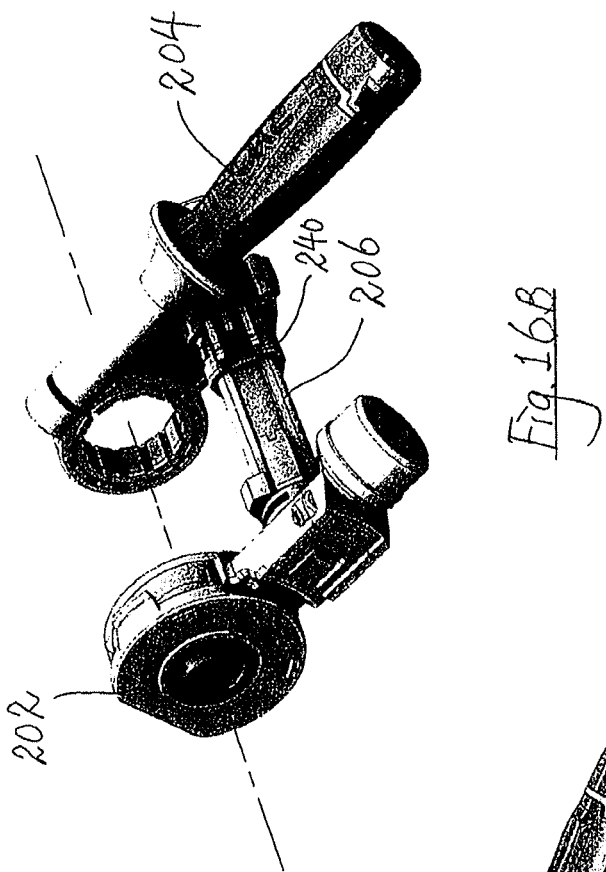
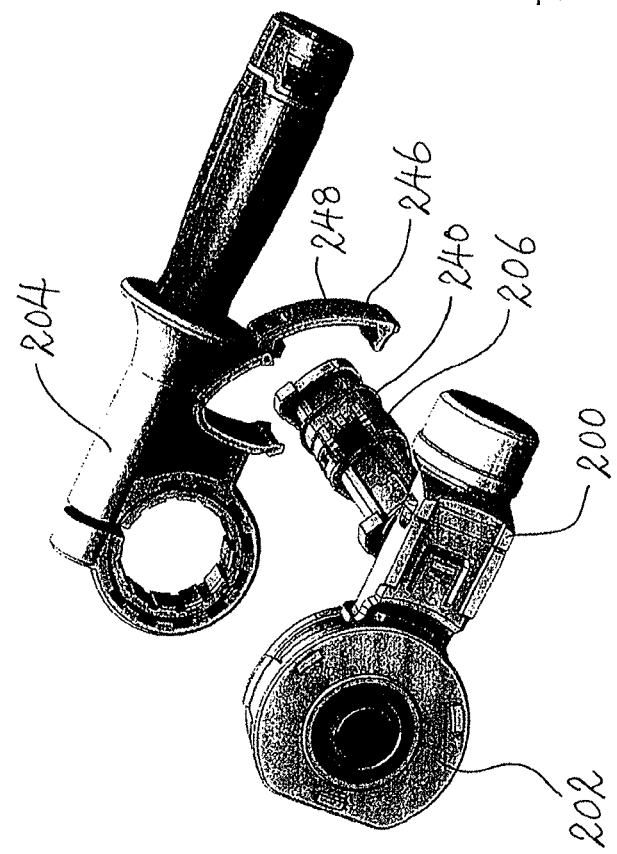
Fig. 16B
Fig. 16A

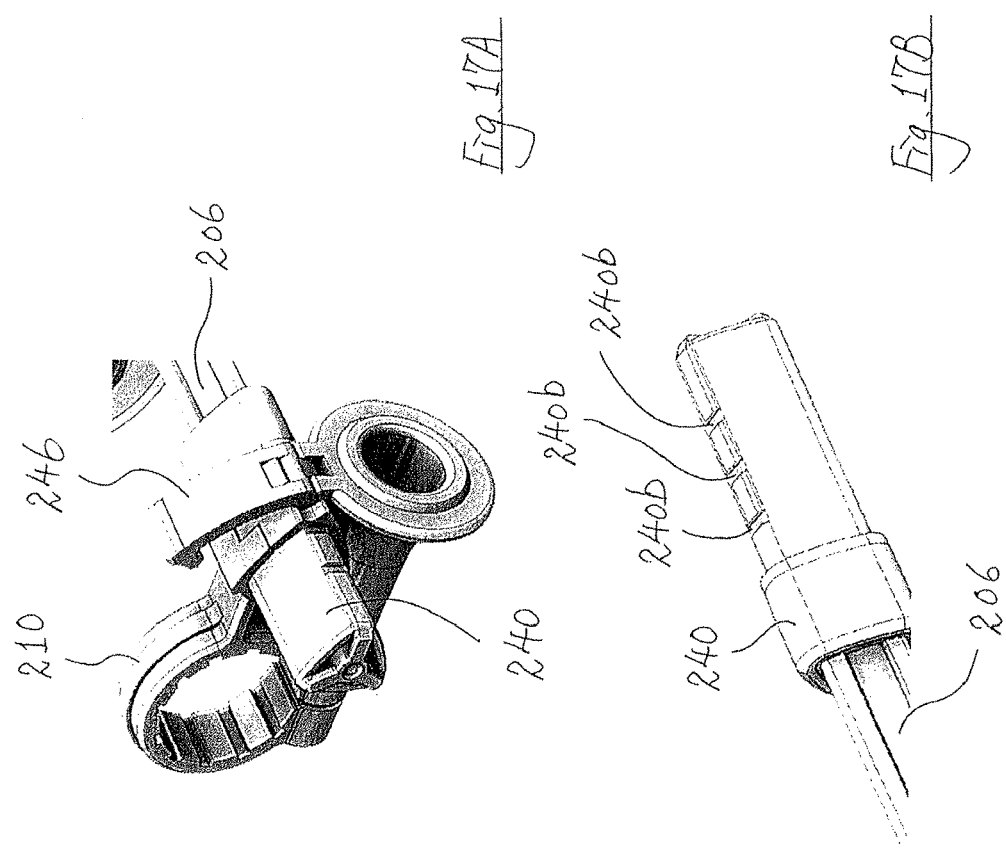

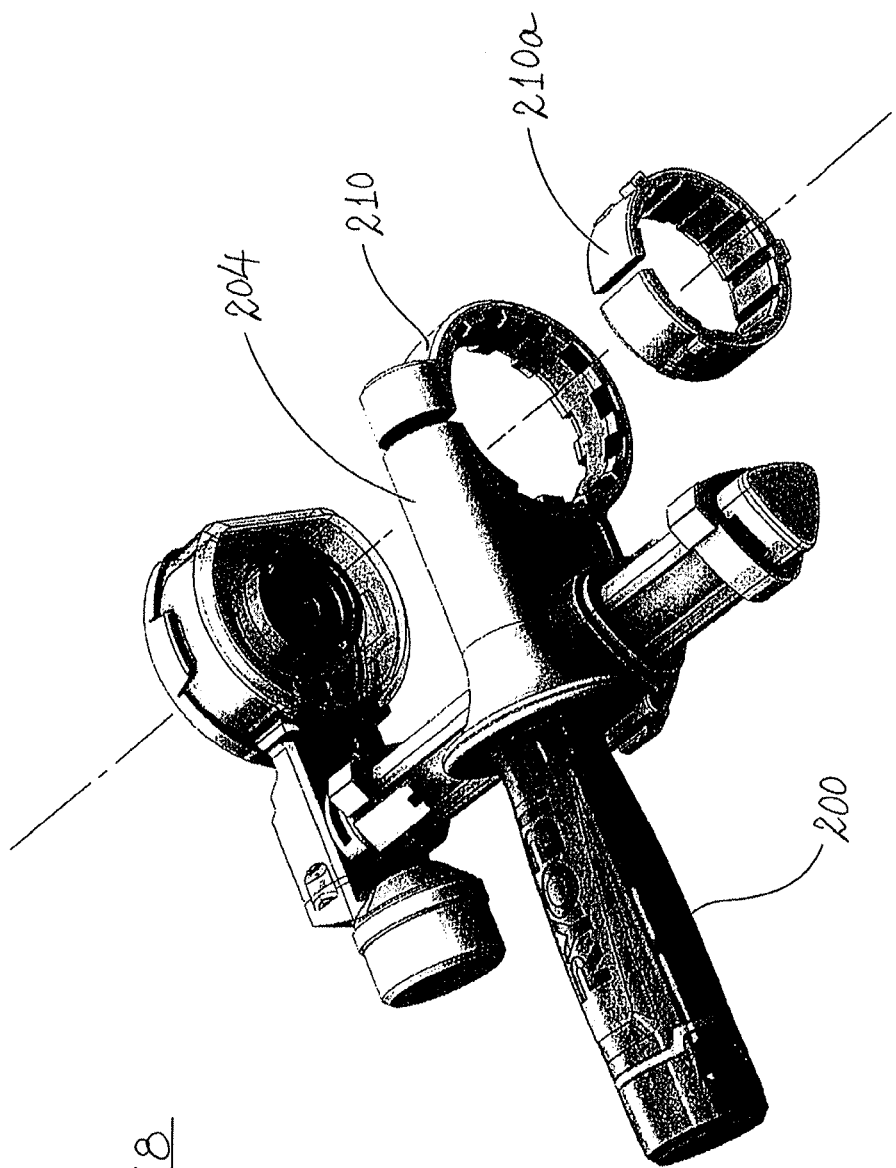

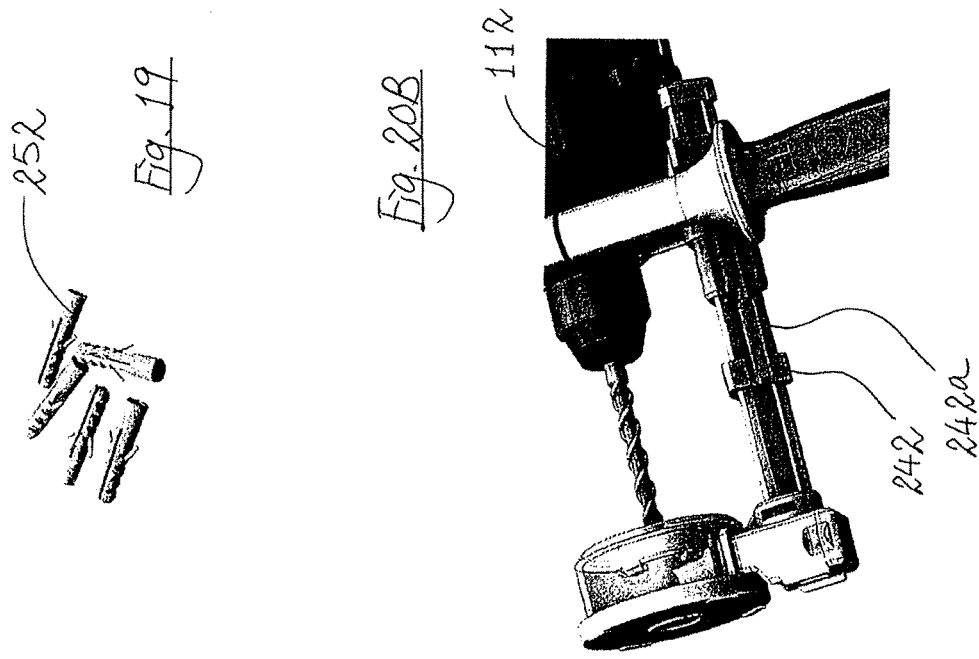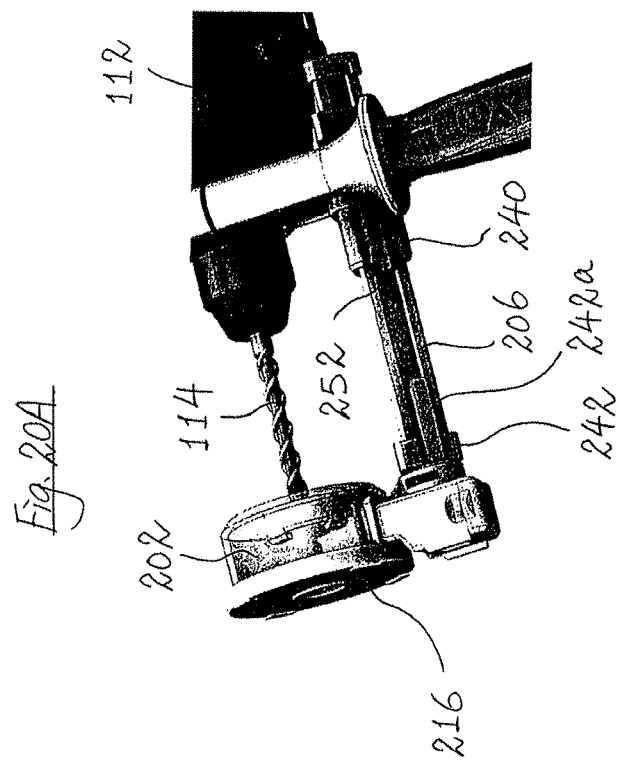

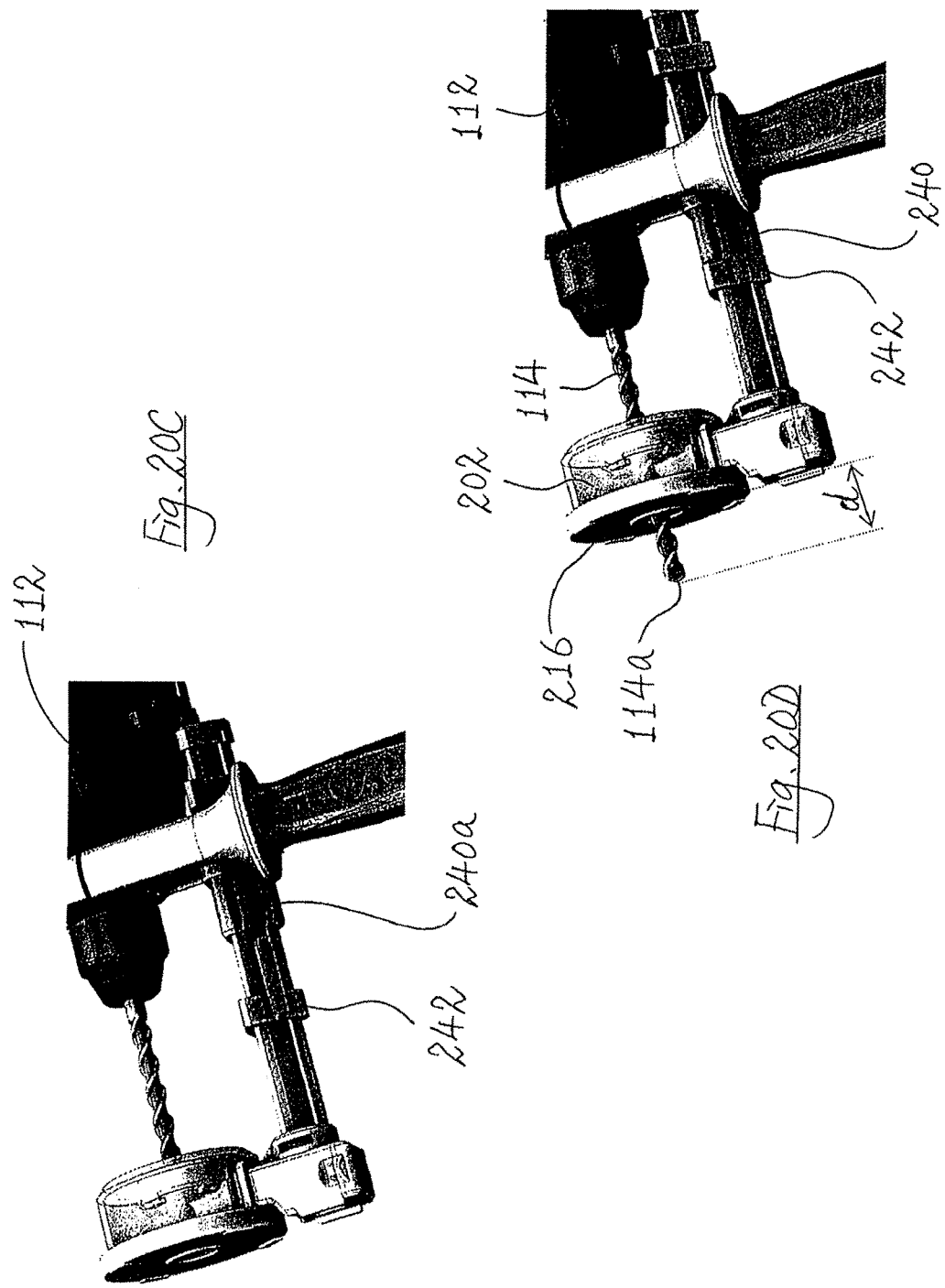

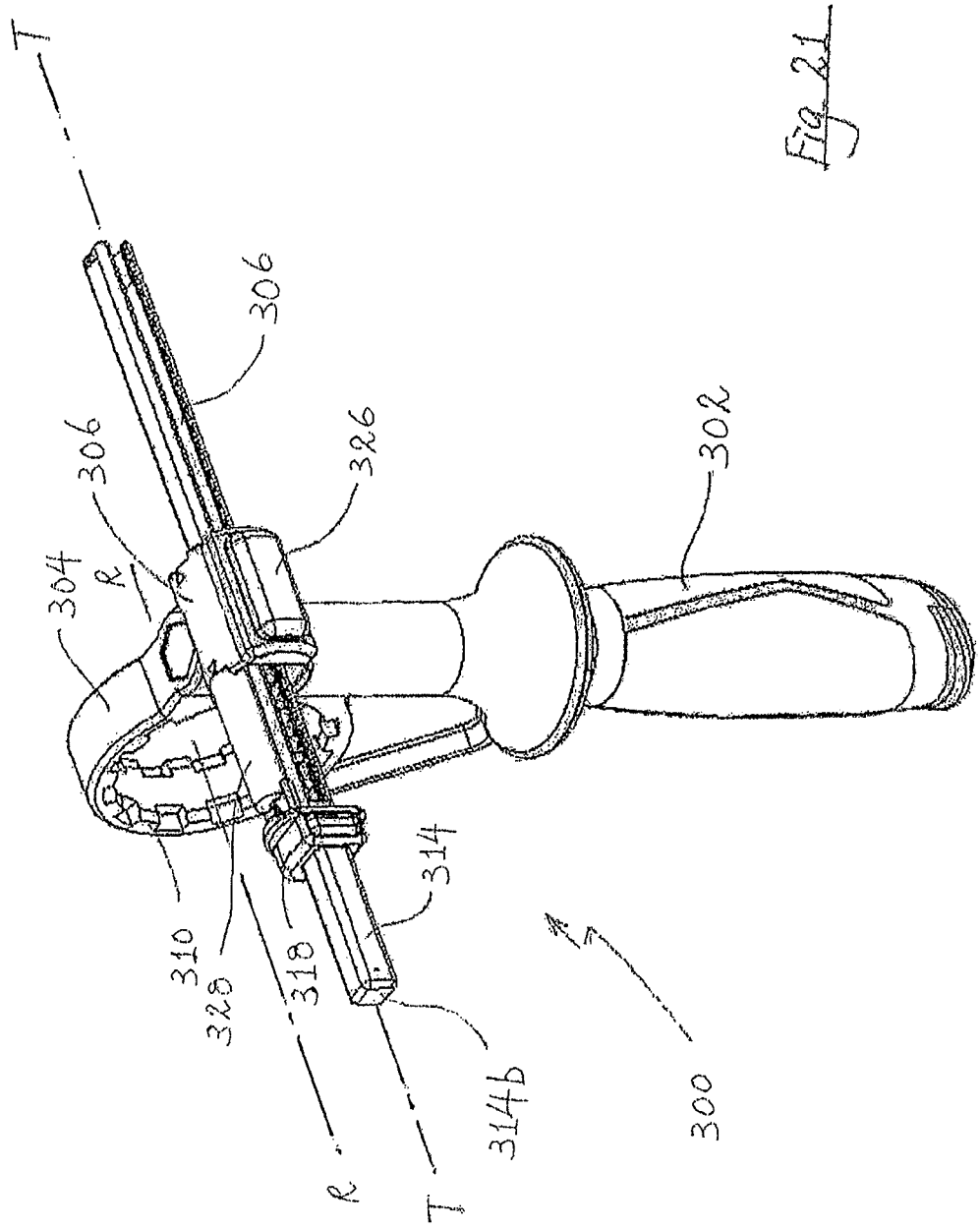

ACCESSORY FOR AN ELECTRIC POWER TOOL

This invention relates to an accessory for an electric power tool and, in particular such an accessory which may be releasably engaged with an electric power tool.

Dust or debris is produced during operation of some electric power tools, e.g. when drilling holes on a wall or ceiling by an electric drill. Various types of dust catchers have been devised or proposed for addressing such a problem. In one type of dust catcher, a container is provided in which a brush is fixedly engaged. A drill bit of the electric drill is received through the container and through a hole of the brush fixed within the container. Upon rotation of the drill bit (e.g. during drilling into a ceiling), the debris or dust so generated is received within the container. However, it is found in practice that when using such a dust catcher in drilling holes upwardly (i.e. with the drill bit pointing upwardly), e.g. when drilling holes in a ceiling, dust falls through the brush onto the user.

In addition, it is difficult for a user of an existing electric drill to accurately determine whether the drill bit has entered a correct distance into the workpiece (e.g. a piece of wood, a wall, or a ceiling). In order to ensure that the drill bit has not gone too deep into the workpiece (thus drilling a hole of a length or depth longer than is required), a user has to deliberately drill firstly a hole of less than the desired depth, then deepen the hole by drilling in stages until the required depth is reached. Such an operation is cumbersome, inaccurate, and prone to errors.

It is thus an object of the present invention to provide an accessory for an electric power tool in which at least one of the aforesaid shortcomings is mitigated, or at least to provide a useful alternative to the trade and public.

According to a first aspect of the present invention, there is provided an accessory for an electric power tool, said accessory including a housing for receiving abraded materials produced by an electric power tool on a workpiece, wherein said housing includes an internal cavity, a first longitudinal end with a first opening communicating with said internal cavity, an opposite second longitudinal end with a second opening communicating with said internal cavity, and at least one movable member, and wherein when a utility part of said electric power tool is received within said internal cavity through said second opening, said movable member is releasably engageable with said utility part of said electric power tool for substantially simultaneous rotational movement about a longitudinal axis of said utility part.

According to a second aspect of the present invention, there is provided an accessory for an electric power tool, said accessory including a housing for receiving abraded materials produced by an electric power tool on a workpiece, and means for releasably engaging said accessory with said electric power tool, wherein said engaging means is movable relative to said housing, and wherein said accessory further includes means for setting the maximum distance through which said engaging means is movable relative to said housing.

According to a third aspect of the present invention, there is provided an accessory for an electric power tool with a utility part, said accessory including means for releasably engaging said accessory with an electric power tool with a utility part, and means for setting, when said electric tool is engaged with said engaging means, a maximum depth of entry of said utility part of said electric power tool into a workpiece, wherein said setting means includes means for abutting said workpiece to prevent further entry of said utility part into said workpiece when said utility part of said electric power tool reaches said set maximum depth of entry into said workpiece.

According to a fourth embodiment of the present invention, there is provided an accessory for an electric power tool, said accessory including a housing for receiving abraded materials produced by an electric power tool on a workpiece, means for releasably engaging said accessory with said electric power tool, means for setting the maximum distance through which said engaging means is movable relative to said housing, and a rail member with at least one recess, wherein said setting means is movable between a locking configuration in which said setting means is locked against movement relative to said rail member and an unlocked configuration in which said setting means is movable relative to said rail member, wherein said setting means includes a body part and a lock part which are slidingly movable relative to each other to move said setting means between said locking configuration and said unlocked configuration, wherein when said setting means is in said locking configuration, a locking element of said lock part is at least partly received within said recess of said rail member to prevent relative movement between said setting means and said rail member, and when said setting means is in said unlocked configuration, said locking element of said lock part is moved by said body part out of engagement with said recess of said rail member to allow said setting means to slide relative to said rail member.

Accessories for an electric drill according to the present invention will now be described, by way of examples only, with reference to the accompany drawings, in which:

FIG. 1 is a front perspective view of an accessory for an electric drill according to a first embodiment of the present invention;

FIG. 2 is a rear perspective view of the accessory of FIG. 1;

FIG. 5A is a side view showing the electric drill positioned relative to the accessory at a rear-most position;

FIG. 5B is a side view showing the electric drill positioned relative to the accessory at a front-most position;

FIG. 6 is a front view showing a handle of the accessory in two possible positions;

FIG. 7 is an enlarged partial view of the accessory of FIG. 1, showing a clamp for setting the maximum drill movement distance;

FIGS. 8A and 8B are side views showing the clamp of FIG. 7 being movable to adjust the maximum drill movement distance;

FIGS. 9A and 9B show detachment of the dust catcher from the accessory of FIG. 1;

FIGS. 10 and 11 show use of the dust catcher of the accessory of FIG. 1 as a stand-alone accessory for an electric drill;

FIG. 13 is a rear perspective view of the accessory of FIG. 12;

FIG. 14 is a perspective view showing the accessory of FIG. 12 engaged with an electric drill;

FIG. 15 is a rear perspective view showing the accessory of FIG. 12 engaged with an electric drill;

FIGS. 16A and 16B show releasable engagement of a drill engagement part with a rail of the accessory of FIG. 12;

FIGS. 17A and 17B show the drill engagement part engageable at different positions on the rail of the accessory of FIG. 12;

FIG. 18 shows the accessory of FIG. 12 with a detachable collar;

FIG. 19 shows a number of plastic anchors;

FIGS. 20A to 20D show steps of setting a maximum drill movement distance for an accessory for an electric drill according to a still further embodiment of the present invention;

FIG. 21 is a perspective view of an accessory for setting a maximum drill movement distance for an electric drill;

Figure 3:
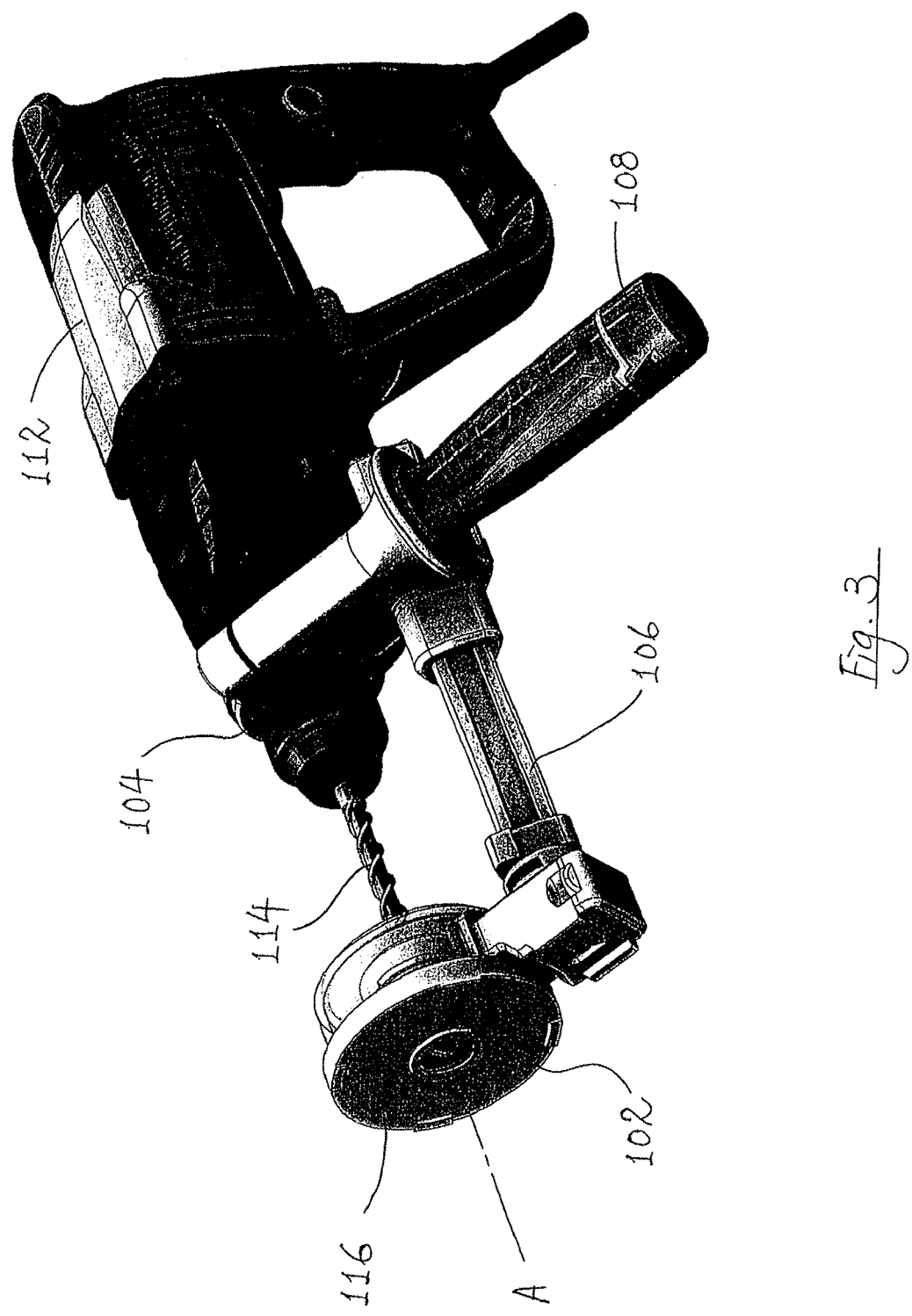
FIG. 3 is a perspective view showing the accessory of FIG. 1 engaged with an electric drill.

An accessory for an electric power tool (such as an electric drill) is shown in FIGS. 1 and 2, generally designated as 100. The accessory 100 includes a dust catcher 102 and a drill engagement part 104 which are engaged with each other via a rail 106. The drill engagement part 104 is fixedly engaged with a handle 108 for simultaneous movement, so that a user may hold the handle 108 to move the drill engagement part 104 accordingly. The longitudinal axis of an annular collar 110 of the drill engagement part 104 is aligned with the longitudinal axis of the dust catcher 102, along a same axis A-A.

As shown in FIG. 3, an electric drill 112 with a drill bit 114 is releasably engaged with the accessory 100 by having a front end of the electric drill 112 received through and contacting the collar 110. The drill bit 114 is received through the dust catcher 102 such that a free end of the drill bit 114 is flush with an outer longitudinal end 116 of the dust catcher 102. When the electric drill 112 is thus engaged with the accessory 100, the central longitudinal axis of rotation of the drill bit 114 is aligned with the axis A-A.

Figure 4:
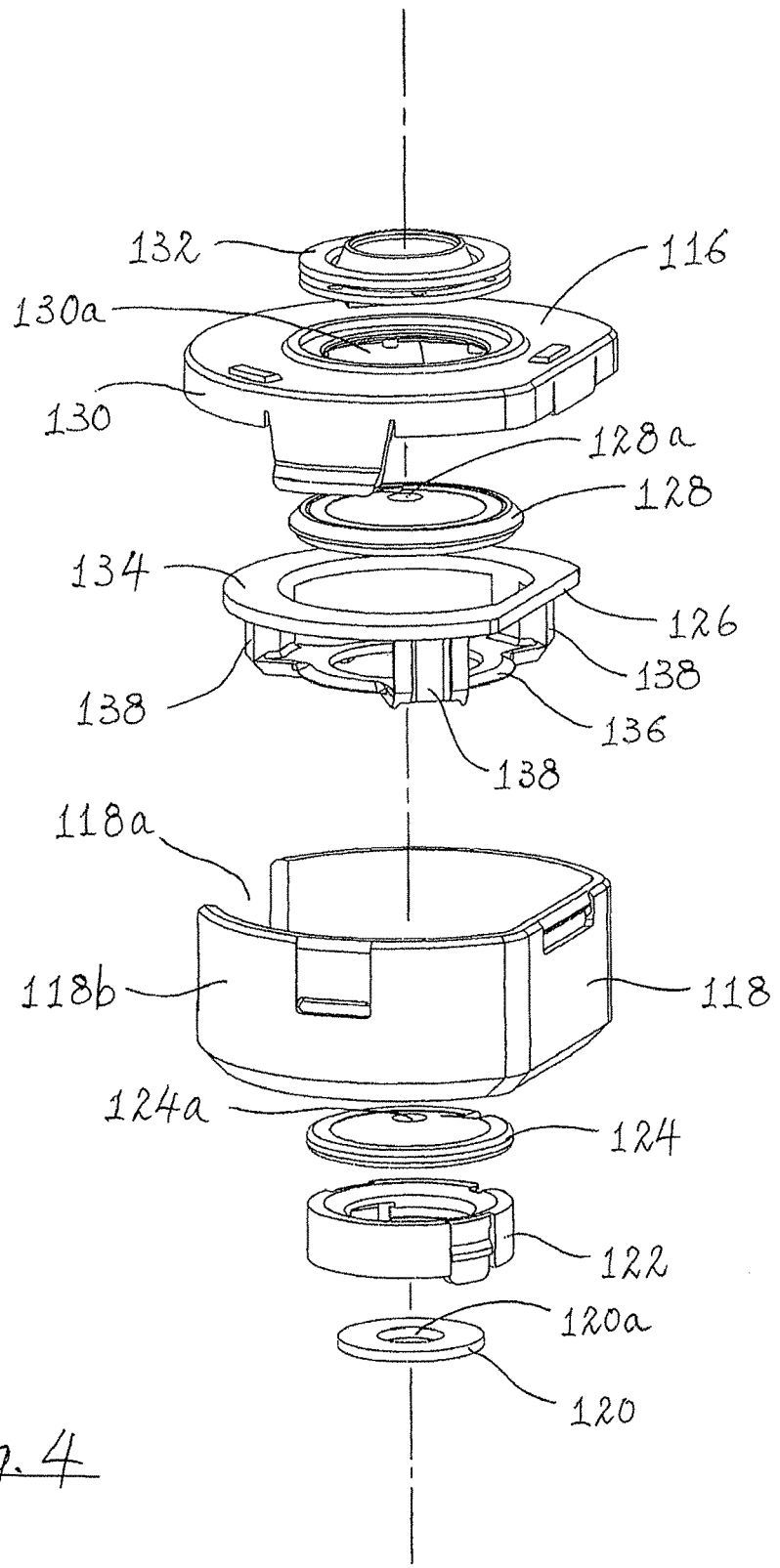
FIG. 4 is an exploded view of a dust catcher of the accessory of FIG. 1.

As shown in FIG. 4, the dust catcher 102 is shown as including a dust box 118 for receiving abraded materials produced by the electric drill on a workpiece, e.g. a wall, a ceiling, or a piece of metal. The dust box 118 is transparent to allow easy observation of its internal cavity. The dust catcher 102 also includes a metal ring 120, a brush holder 122, a first brush 124, a mounting frame 126, a second brush 128, a dust box cap 130 with the outer longitudinal end 116, and a rubber seal 132. All the components (including the metal ring 120, the brush holder 122, the first brush 124, the mounting frame 126, the second brush 128, the dust box cap 130 and the rubber seal 132) are generally cylindrical or annular in shape, each having a respective central longitudinal through hole. When the dust catcher 102 is properly assembled, a lower surface of the dust box 118 constitutes a longitudinal end of the dust catcher 102 which is opposite to the outer longitudinal end 116. A drill bit 114 may be received through the holes of all these components (all aligned with one another along a common longitudinal axis), with the free end of the drill bit 114 entering the dust catcher 102 through an opening 120a of the metal ring 120 and exiting the dust catcher 102 through an opening 130a the dust box cap 130.

The metal ring 120 and the brush holder 122 are fixedly engaged to an inner bottom surface of the dust box 118. The first brush 124 is fixedly engaged with the brush holder 122. The first brush 124 has a number of bristles radially formed around a central opening 124a. The mounting frame 126 has an upper rim 134 and a lower rim 136 joined with each other by a number of ribs 138. The upper rim 134 of the mounting frame 126 is fixedly engaged with a lower surface of the dust box cap 130 to form a confined space containing the second brush 128. The second brush 128 is sized and shaped to be freely movable within the confined space between the mounting frame 126 and the dust box cap 130. The second brush 128 also has a number of bristles radially formed around a central opening 128a. The dust box 118 has an opening 118a for connection with a suction source (e.g. a vacuum cleaner) to allow sucking out of the content in the dust catcher 102.

When the dust catcher 102 is duly assembled, and when the drill bit 114 of the electric drill 112 is received into the internal cavity of the dust catcher 102 through the opening 120a of the metal ring 120, the drill bit 114 is received through the opening 124a of the first brush 124 and through the opening 128a of the second brush 128. The drill bit 114 is thus releasably engaged with the second brush 128 via the central opening 128a. As the first brush 124 is fixed relative to the dust box 118, the first brush 124 will remain stationary upon rotation of the drill bit 114 about its own central longitudinal axis of rotation. On the other hand, upon rotation of the drill bit 114 about its own central longitudinal axis of rotation, the drill bit 114 is frictionally engaged with the second brush 128, so that the second brush 128 is brought into simultaneous corresponding rotational movement about its own longitudinal axis, which coincides with the central longitudinal axis of rotation of the drill bit 114.

During drilling operation, a user may hold the electric drill 112 with one hand and hold the handle 108 of the accessory 100 with another hand. The outer longitudinal end 116 of the dust catcher 102 is then moved to abut a surface of the workpiece (e.g. a wall or a ceiling) to be drilled. Upon activation of the drill 112, the drill bit 114 is caused to rotate and the user pushes the handle 108 to cause the drill engagement part 104 (and thus the drill 112 engaged with it) to move towards the dust catcher 102, whereupon a length of the drill bit 114 will extend through the opening of the outer longitudinal end 116 of the dust catcher 102 and drill into the workpiece. During rotation of the drill bit 114, the second brush 128 will be brought into simultaneous rotational movement about the central longitudinal axis of rotation of the drill bit 114. In addition, as the second brush 128 is only frictionally engaged with the drill bit 114, the drill bit 114 may move axially relative to the second brush 128, towards and away from the dust catcher 102.

It is found in practice that, with such an arrangement, when using the electric drill 112 engaged with the accessory 100 to drill a hole into a ceiling, dust or other materials produced by the drilling operation which falls into the dust catcher 102 through the opening 130a of the dust box cap 130 will drop on the upper surface of the rotating second brush 128 (i.e. the surface of the second brush 128 facing the workpiece). Only a very small proportion of such dust and abraded materials will fall onto a user of the electric drill 112 through the opening 124a of the first brush 124 and the opening 120a of the metal ring 120, as a very large proportion of such dust and abraded materials will be forced by the rotating second brush 128 to move, transverse to the longitudinal axis of rotation of the second brush 128 and towards side walls 118b of the dust box 118, and to deposit on an inner lower surface of the dust box 118, for subsequent disposal. If desired, the dust box cap 130 may be detached from the dust box 118 by twisting the dust box cap 130 relative to the dust box 118, so as to allow the content in the dust box 118 to be cleared out.

As shown in FIG. 5A, when the electric drill 112 is engaged with the accessory 100, a free end 114a of the drill bit 114 is flush with the outer longitudinal end 116 of the dust catcher 102. The outer longitudinal end 116 of the dust catcher 102 is planar and is thus adapted to abut a surface of a workpiece, such as a wall surface, a ceiling surface or a surface of a piece of metal. When the outer longitudinal end 116 of the dust catcher 102 abuts the surface of a workpiece to be drilled, the free end 114a of the drill bit 114 also touches the surface of the workpiece.

As shown in FIGS. 5A and 5B, the drill engagement part 104 is movable along the rail 106 between the position shown in FIG. 5A in which the drill engagement part 104 is at an allowed maximum distance away from the dust catcher 102 (and in which the free end 114a is flush with the outer longitudinal end 116 of the dust catcher 102) and the position shown in FIG. 5B in which a slider 140 of the drill engagement part 104 (which is engaged with the rail 106 for relative sliding movement) abuts a clamp 142 on the rail 106, and in which a length of the drill bit 114 extends out of the dust catcher 102. The drill engagement part 104 is biased by a spring (not shown) towards the position shown in FIG. 5A.

As the electric drill 112 is engaged with the drill engagement part 104, to-and-fro movement of the drill engagement part 104 along the rail 106 will bring about corresponding to-and-fro movement of the electric drill 112 relative to the dust catcher 102. As the outer longitudinal end 116 of the dust catcher 102 abuts a surface of the workpiece during operation of the drill 112, the length of the drill bit 114 which extends out of the dust catcher 102 is the depth to which the drill bit 114 enters the workpiece (i.e. the depth of the hole formed by the drill 112 in the workpiece). It can therefore be seen that the distance a between the slider 140 and the clamp 142 as shown in FIG. 5A (which may be termed the "maximum drill movement distance") is the length of the drill bit 114 which extends out of the dust catcher 102 when the slider 140 is moved to meet the clamp 142 (as shown in FIG. 5B), and is the maximum depth to which the drill bit 114 may enter a workpiece.

To allow the accessory 100 to be used in more varied environments, and as shown in FIG. 6, the handle 108 is pivotable about an axis parallel to the longitudinal axis A-A of the dust catcher 102 between an upper position 108' and a lower position 108".

The accessory 100 includes a mechanism allowing a user to adjust the maximum distance between the slider 140 and the clamp 142 (i.e. the maximum drill movement distance), to thereby adjust the maximum depth to which the drill bit 114 may enter a workpiece. As shown in FIG. 7, the clamp 142 has an arm 142a which is pivotable relative to a body 142b between an open position (as shown in FIG. 7) and a closed position in which the arm 142a closes with the body 142b to form a closed loop. An inner surface of the arm 142a has a tooth 142c which may be received in one of a number of cavities 106a at different positions along the rail 106 to lock the clamp 142 at those positions against movement relative to the rail 106. When the arm 142a is in the open position, the clamp 142 is slidable on and along the rail 106. By way of such an arrangement, a user may pivot the arm 142a relative to the body 142b to the open position, move the clamp 142 along the rail 106 to a desired position, and then pivot the arm 142a relative to the body 142b back to the closed position to move the tooth 142c into locking engagement with the cavity 106a at the position, to thereby lock the clamp 142 against movement relative to the rail 106. As shown in FIG. 8A, the clamp 142 is moved away from its position as shown in FIGS. 5A and 5B and locked on the rail 106 in a position which is closer to the slider 140. It can be seen that the distance b between the slider 140 and the clamp 142 is shorter than the distance a shown in FIGS. 5A and 5B. In particular, this distance b is the newly-adjusted length of the drill bit 114 which extends out of the dust catcher 102 when the slider 140 is moved to meet the clamp 142 (as shown in FIG. 8B), and the newly-adjusted maximum depth to which the drill bit 114 may now enter a workpiece.

The dust catcher 102 may be removed from the rest of the accessory 100 to form a stand-alone accessory. As shown in FIGS. 9A and 9B, to remove the dust catcher 102 from the rest of the accessory 100, the dust catcher 102 is pivoted from the position shown in FIG. 9A in which the dust catcher 102 is locked with the rail 106 of the accessory 100, through 90° about an axis parallel to the axis A-A, to the position shown in FIG. 9B in which the dust catcher 102 is removable from the rail 106 of the accessory 100.

When the dust catcher 102 is thus detached from the rest of the accessory 100, it may be used as a stand-alone accessory for the electric drill 112, as shown in FIGS. 10 and 11. n A connector cap 143 may be removed from the stand-alone accessory and a port adaptor 144 may then be releasably connected with the stand-alone dust catcher 102 for connection with a vacuum cleaner VC, so as to provide a suction source to the dust catcher 102.

Figure 12:
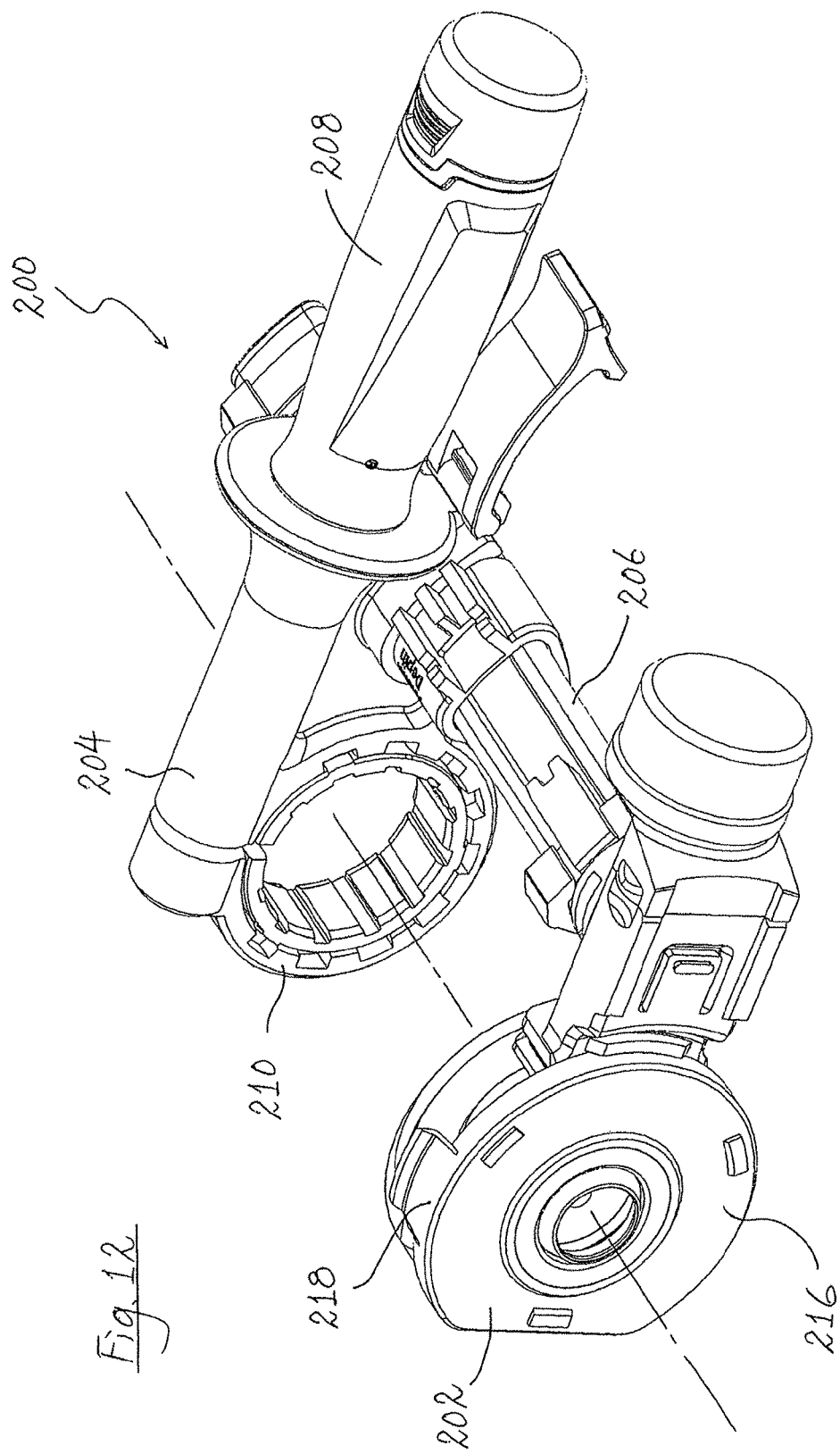
FIG. 12 is a front perspective view of an accessory for an electric drill according to a further embodiment of the present invention.

An accessory for an electric drill according to a further embodiment of this invention is shown in FIGS. 12 and 13, and generally designated as 200. The structure and manner of operation of the accessory 200 are similar to those of the accessory 100 discussed above. Thus, only the differences between the accessories 100 and 200 are discussed here. FIGS. 14 and 15 show engagement of the electric drill 112 with the accessory 200.

The accessory 200 has a dust catcher 202 which is operatively associated with and connected with a drill engagement part 204 via a rail 206. The drill engagement part 204 includes a handle 208 and an annular collar 210 which are engaged with each other for simultaneous sliding movement along the rail 206.

As distinct from the dust catcher 102 of the accessory 100 discussed above, the dust catcher 202 of the accessory 200 has a dust box 218 with a non-circular transverse cross section, such as a transverse cross section of a cut-circle shape. A dust box cap 230 is correspondingly shaped to match the dust box 218. Such an arrangement allows the accessory 200 to be used closed to the corner or edge of adjoining walls and/or ceilings, or other workpieces.

In addition, and as shown in FIGS. 16A and 16B, the drill engagement part 204 is releasably engaged with the rest of the accessory 200 by a clamp 246. More particularly, the clamp 246 has an arm 248 which is pivotable relative to the rest of the engagement part 204 between an open position (as shown in FIG. 16A) and a closed position (as shown in FIG. 16B). When the arm 248 is at the open position, the drill engagement part 204 is releasable from a slider 240 which is slidable along and on the rail 206. This allows a user to engage the drill engagement part 204 with the slider 240 in a different orientation, allowing a user to hold the electric drill 112 by his/her left hand and hold the handle 208 of the accessory 200 by his/her right hand for operating the drill 112.

Moreover, as shown in FIGS. 17A and 17B, the slider 240 has several recesses 240b which allow ready engagement of the drill engagement part 204 (via the clamp 246) with the slider 240 at a number of pre-set positions to adjust the maximum distance between the drill engagement part 204 and the dust catcher 202.

Furthermore, and returning to FIG. 13, in addition to having a clamp 242 which is movable on the rail 206 on the side between the drill engagement part 204 and the dust catcher 202, the accessory 200 has a further clamp 250 on the rail 206 on a side opposite to the dust catcher 202. The clamp 250 also has an arm 250a which is pivotable relative to a body 250b between an open position and a closed position (as shown in FIG. 13) in which the arm 250a closes with the body 250b to form a closed loop. Similar to the clamp 142 of the accessory 100 discussed above, an inner surface of the arm 250a has a tooth which may be received in one of a number of cavities 206a along the rail 206 to selectively lock the clamp 250 at different positions along the rail 206 against movement relative to the rail 206. When the arm 250a is in the open position, the clamp 250 is slidable on and along the rail 206. By way of such an arrangement, a user may pivot the arm 250a relative to the body 250b to the open position, move the clamp 250 along the rail 206 to a desired position, and then pivot the arm 250a relative to the body 250b back to the closed position to move the tooth of the arm 250a into locking engagement with the cavity 206a at the desired position, to thereby lock the clamp 250 at the desired position against movement relative to the rail 206. Thus, both the clamp 242 and the clamp 250 are movable along the rail 206 and selectively positionable in a respective desired location along the rail 206, to thereby adjust the distance there-between to thereby adjust the maximum depth to which the drill bit 114 of the electric drill 112 engaged with the accessory 200 may enter a workpiece.

A further purpose of providing the clamp 250 is to adjust the maximum distance between the drill engagement part 204 and the dust catcher 202. For proper operation of the accessory 200, the distance between the drill engagement part 204 and the dust catcher 202 should be so arranged that when the electric drill 112 is engaged with the accessory 200, the free end 114a of the drill bit 114 is flush with an outer longitudinal end 216 of the dust catcher 202. However, electric drills are of various sizes and drill bits are of various lengths. The clamp 250 is thus selectively lockable in different positions along the rail 206 to adjust the distance between the drill engagement part 204 and the dust catcher 202 to suit the accessory 200 for use with electric drills of different sizes and electric drills installed with drill bits of different lengths.

Moreover, the accessory 200 has an ancillary collar 210a in the general shape of a letter "C" with a narrow gap. The ancillary collar 210a is sized to be received within and engaged with the collar 210 of the drill engagement part 204. As the collar 210 is fixed and is thus of a fixed inner diameter, it cannot fit electric drills of different sizes. The ancillary collar 210a may thus be releasably fitted within the collar 210 to effectively reduce the inner diameter of the collar 210, so as to allow the accessory 200 to be used in conjunction with an electric drill with an appropriate cylindrical portion of a smaller diameter.

In addition, the accessory 200 has a mechanism for accurately and quickly positioning the clamp 242 along the rail 206 to adjust the maximum depth to which the drill bit 114 of the electric drill 112 engaged with the accessory 200 may enter a workpiece. In this connection, a number of elongate plastic anchors 252 used in conjunction with drilling holes in walls or ceilings are shown in FIG. 19. The mechanism drill depth adjustment mechanism is suitable (though not exclusively) for setting the maximum drill depth to be the length of a plastic anchor 252.

As shown in FIG. 20A, when the electric drill 112 is engaged with the accessory 200, the drill engagement part 204 is adjusted such that the free end 114a of the drill bit 114 is flush with the outer longitudinal end 216 of the dust catcher 202. It can be seen that the clamp 242 has a tongue 242a facing the slider 240. The slider 240 has a central channel 240a into which one plastic anchor 252 is received. The tongue 242a of the clamp 242 is also receivable into the channel 240a of the slider 240. The clamp 242 is then moved along the rail 206 to a position in which the tongue 242a touches a longitudinal end of the plastic anchor 252, as shown in FIG. 20B. The clamp 242 is then locked at that location on the rail 206 against movement relative to the rail 206, and the plastic anchor 252 is then removed, as shown in FIG. 20C. The drill engagement part 204 is then movable on and along the rail 206 towards the dust catcher 202 until the tongue 242a reaches the end of the channel 240a in the slider 240. The distance covered by the drill engagement part 204 during such a movement equals the length d of the drill bit 114 which extends through the outer longitudinal end of the dust catcher 202, which also equals the length of the plastic anchor 252. This mechanism therefore allows a user to easily and accurately set the drill depth of the accessory 200 to be the length of a plastic anchor 252. By using an elongate member of different lengths (but of a width receivable within the channel 240a), different maximum drill movement distances (and thus different drill depths) can also be accurately and conveniently set.

Figure 22:
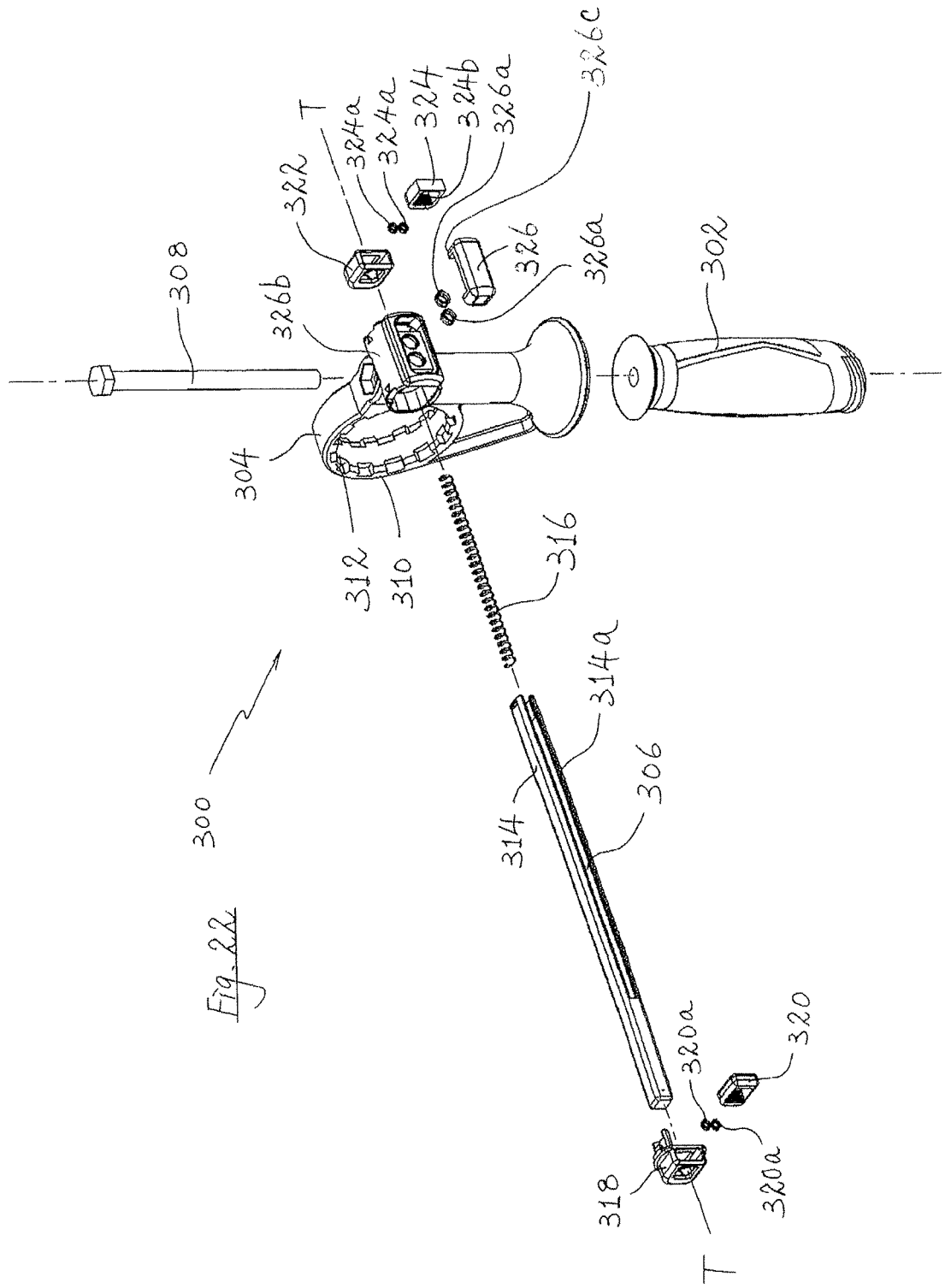
FIG. 22 is an exploded view of the accessory of FIG. 21.

A further accessory for an electric power tool (such as an electric drill) according to the present invention is shown in FIGS. 21 and 22, and generally designated as 300. The accessory 300 includes a handle 302, a tool engagement part 304, and a depth setting mechanism 306. The handle 302 is engaged with the tool engagement part 304 by a screw 308. The tool engagement part 304 has an annular collar 310 for releasable engagement with a generally cylindrical front part of an electric power tool, e.g. an electric drill. The collar 310 has a number of ridges 312 along its inner surface for better gripping of the cylindrical front part of an electric drill. When the electric drill is engaged with the accessory 300, the central axis of rotation of a drill bit carried by the electric drill lies on an axis R-R.

The depth setting mechanism 306 includes a rod 314 biased by a spring 316, a front stopper 318 engaged with a spring-loaded front stopper adjustment button 320, a rear stopper 322 engaged with a spring-loaded rear stopper lock 324, and a spring-loaded rod adjustment button 326.

When the accessory 300 is duly assembled, the front stopper 318 may be moved along the rod 314 and be locked against movement relative to the rod 314. Normally, when the front stopper 318 is located at a certain position on the rod 314, the spring-loaded front stopper adjustment button 320 is biased by springs 320a to act on the rod 314 to prevent movement of the front stopper adjustment button 320 (and thus the front stopper 318 with which it is engaged) relative to the rod 314. In particular the front stopper adjustment button 320 has a number of inwardly extending teeth adapted to be in mesh with a row of teeth 314a provided along the rod 314. The front stopper adjustment button 320 may be pressed (against the biasing force of the springs 320a) to remove its engagement with the rod 314 (i.e. bringing its out of mesh with the teeth 314a), thus allowing it and the front stopper 318 with which it is engaged to slide along the rod 314 to a different position. When the front stopper 318 reaches a desired position on the rod 314, a user may release the pressing force on the front stopper adjustment button 320, whereupon the stopper adjustment button 320 is biased by springs 320a to act again on the rod 314 (in which the teeth of the front stopper adjustment button 320 return to be in mesh with the teeth 314a of the rod 314), to prevent movement of the front stopper adjustment button 320 and the front stopper 318 relative to the rod 314.

The rear stopper 322 is also engaged with the rear stopper adjustment button 324, which is biased by springs 324a to act on the rod 314. The structure and manner of operation of the rear stopper 322 are identical to those of the front stopper 318 and therefore will not be repeated here. It should however be noted that a leg 326c of the rod adjustment button 326 is received within a cavity 324b of the rear stopper lock 324 such that movement of the rod adjustment button 326 towards or away from an axis T-T brings about corresponding simultaneous movement of the rear stopper lock 324. The rear stopper lock 324 has a number of inwardly extending teeth for engagement with the teeth 314a along the rod 314.

By way of such an arrangement, when in the normal configuration, the rod adjustment button 326 is at a position where it is farther away from the axis T-T, in which position the teeth within the cavity 324b of the rear stopper lock 324 are in mesh with the teeth 314a of the rod 314, thus preventing relative movement between the rod 314 and the rear lock 324. It should be noted that the axis T-T and the axis R-R are parallel to each other.

To set a maximum depth of drill equalling to a length of a plug to be inserted into the hole formed by an electric drill in a workpiece (e.g. a wall or ceiling) with the accessory 300, the electric drill is firstly engaged with the accessory 300 by having a cylindrical front part of the electric drill engaged with the collar 310 such that a drill bit installed to the electric drill lies on the axis R-R. The rod adjustment button 326 is then pressed, thus allowing the rod 314 to be moved axially along the axis T-T. When the rod adjustment button 326 is so pressed, the spring 316 is also allowed to extend to its normal extended configuration. The rod 314 is moved until its front end surface 314b is co-terminus with the front end of the drill bit. Put another way, the rod 314 is moved relative to the rest of the accessory 300 to a position where a line passing through the front end of the drill bit and the front end surface 314b is perpendicular to the axis T-T or the axis R-R. The pressing force on the rod adjustment button 326 is then released and the rear stopper lock 324 is locked onto the rod 314 against relative movement therebetween. This limits the forward-most position of the rod 314.

A plug 328 is then placed in a slot on the rod 314 between the front stopper 318 and the body portion 326b, with a first longitudinal end of the plug 328 abutting the body portion 326b. The front stopper 318 is then moved along the rod 314 until it touches a second opposite longitudinal end of the plug 328, at which point the front stopper adjustment button 320 is allowed to return to its spring-biased position to lock the front stopper 318 against movement relative to the rod 314. The plug 328 is then removed from the accessory 300.

When drilling, the drill bit of the electric drill drills into a workpiece. At the same time, the front end surface 314b of the rod 314 contacts the workpiece and causes the rod 314 to retract backward relative to the drill. When the front stopper 318 abuts the body portion 326b, the rod 314 cannot retract further backward and hence the electric drill cannot drill further into the workpiece, thus signifying that the set maximum depth of drill has been reached. After drilling, the spring 316 will extend the rod 314, and the front end surface 314b of the rod 314 will align again with the tip of the drill bit.

Figure 23:
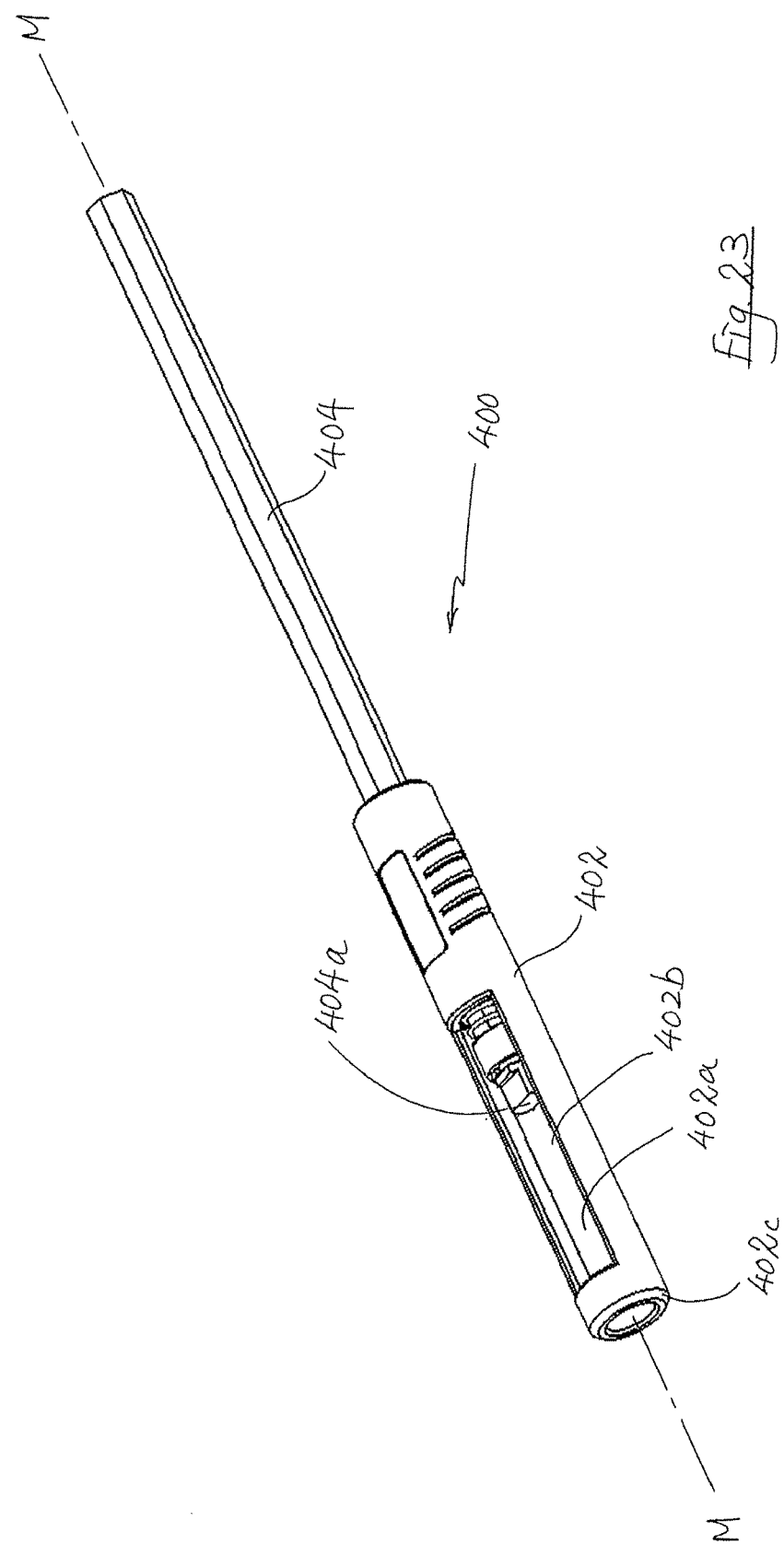
FIG. 23 is a perspective view of a further accessory for setting a maximum drill movement distance for an electric drill.
Figure 24:
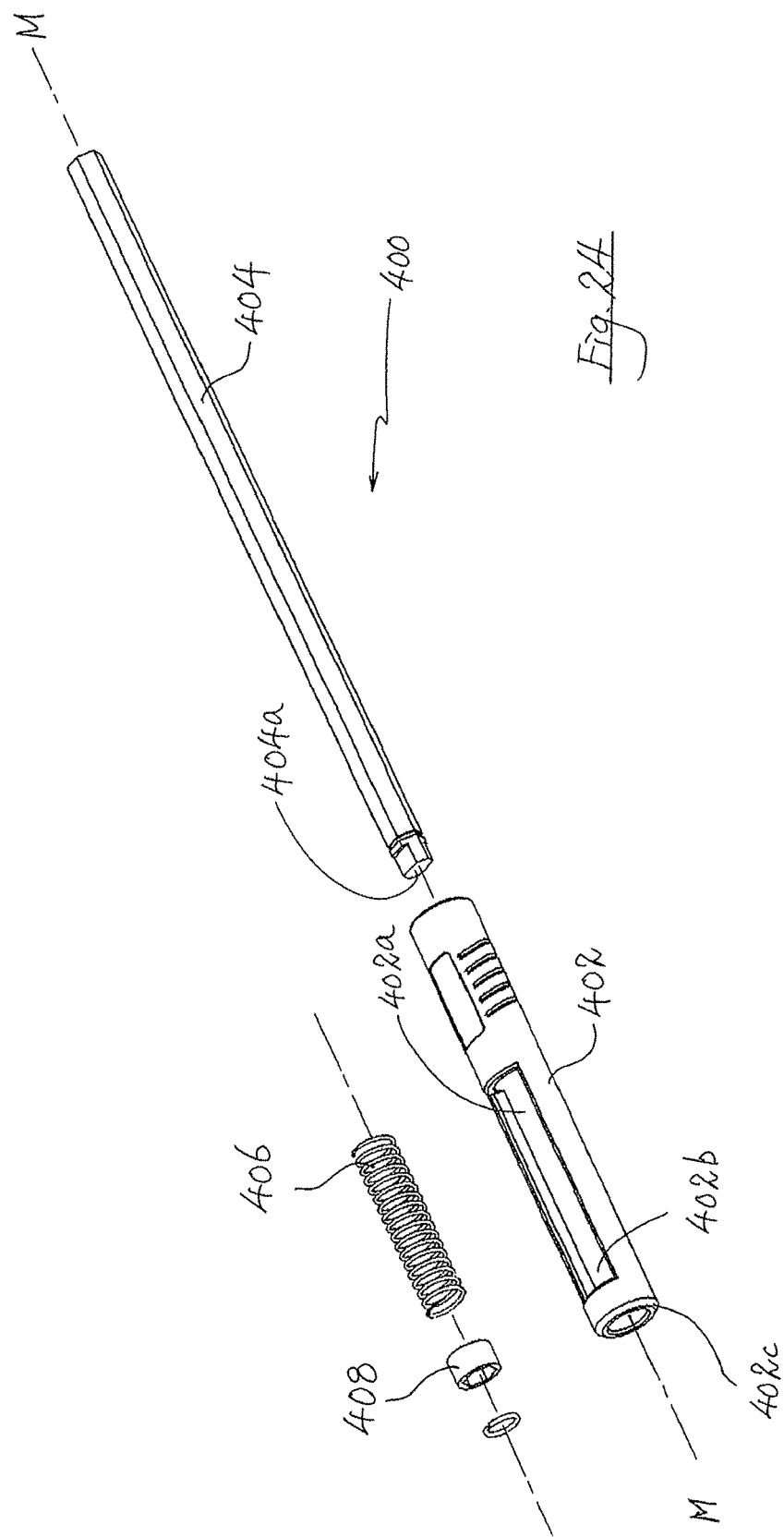
FIG. 24 is an exploded view of the accessory of FIG. 23.

A still further accessory for an electric power tool (such as an electric drill) according to the present invention is shown in FIGS. 23 and 24, and generally designated as 400. The accessory 400 includes a plug cartridge 402 and a rod 404 telescopically engaged with each other for relative sliding movement. The rod 404 is engaged with the plug cartridge 402 via a spring 406 and a locking ring 408. The plug cartridge 402 is slidable relative to the rod 404 between a contracted position in which a front longitudinal end 404a of the rod 404 touches an inner surface of a front longitudinal end 402c of the plug cartridge 402 and an extended position in which the front longitudinal end 404a of the rod 404 is out of contact with the inner surface of the front longitudinal end 402c of the plug cartridge 402 to expose an internal cavity 402a of the plug cartridge 402 to the outside environment.

This accessory 400 is (fixedly or releasably) attached to an engagement part (such as one similar to the tool engagement part 304 discussed above) for releasable engagement with an electric power tool, e.g. an electric drill (not shown). In particular, the engagement part has a collar which engages a front cylindrical portion of the electric drill such that, when the electric drill is engaged with the accessory 400 via the engagement part, the axis of rotation of the drill bit installed to the electric drill is parallel to a longitudinal axis M-M of the accessory 400. It can be seen that the plug cartridge 402 is slidable relative to the rod 404 along the axis M-M.

To set a maximum depth of drill equalling to a length of a plug to be inserted into the hole formed by an electric drill in a workpiece (e.g. a wall or ceiling) with the accessory 400, the electric drill is firstly engaged with the accessory 400 via an engagement part by having a cylindrical front part of the electric drill engaged with the engagement part such that the axis of rotation of the drill bit installed to the electric drill lies on an axis parallel to the axis M-M.

The plug cartridge 402 is then moved away from the rod 404 to expose the internal cavity 402a of the plug cartridge 402 which communicates with the outside environment via a window 402b. The internal cavity 402a and the window 402b of the plug cartridge 402 are each sized and shaped to allow insertion of a plug into the internal cavity 402a through the window 402b.

A plug is then loaded into the internal cavity 402a of the plug cartridge 402 through the window 402b, such that a rear end of the plug contacts the front longitudinal end 404a of the rod 404 and a front end of the plug contacts the inner surface of the front longitudinal end 402c of the plug cartridge 402. The position of the accessory 400 relative to the engagement part is adjusted by moving the accessory 400 axially relative to the engagement part until the front longitudinal end 402c of the plug cartridge 402 is co-terminus with the free end of the drill bit of the electric drill. Put another way, the position of the accessory 400 is adjusted such that (a) its longitudinal axis M-M is parallel to the axis of rotation of the drill bit of the electric drill and (b) the free end of the drill bit of the electric drill and the front longitudinal end 402c of the plug cartridge 402 lie on a line perpendicular to the axis M-M.

The plug is then removed from the plug cartridge 402, whereupon the plug cartridge 402 is moved back to the contracted position. In this situation, the front longitudinal end 402c of the plug cartridge 402 is not co-terminus with the front end of the drill bit, but is retracted with respect to the front end of the drill bit. The distance between the front longitudinal end 402c of the plug cartridge 402 and a line passing through the front end of the drill bit and perpendicular to the axis M-M is thus the length of the plug and is also the set depth of drill.

When drilling, the drill bit of the electric drill drills into a workpiece, but cannot enter further when the front longitudinal end 402c of the plug cartridge 402 contacts the surface of the workpiece, thus signifying that the set depth of drill has been reached.

Figure 25:
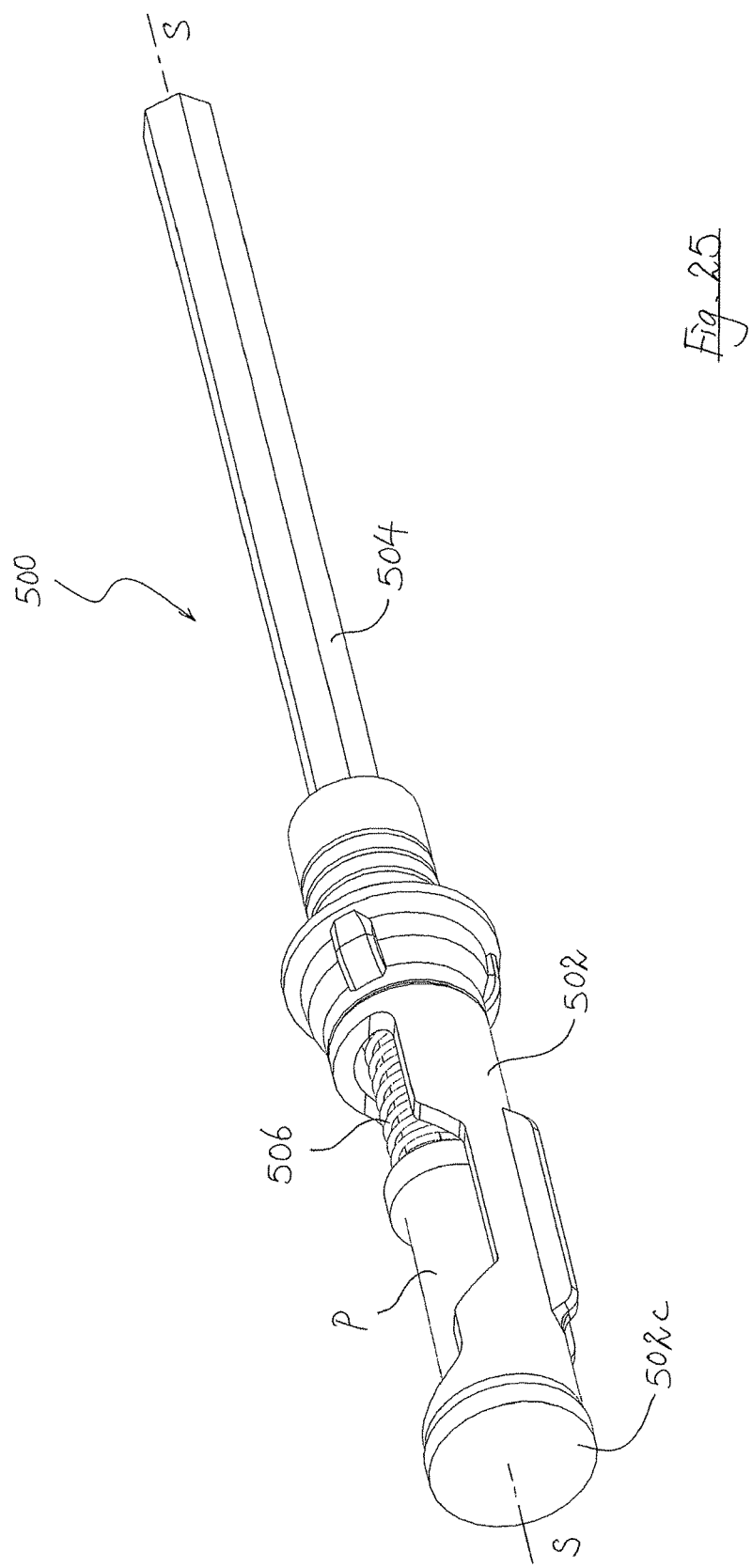
FIG. 25 is a perspective view of a yet further accessory for setting a maximum drill movement distance for an electric drill.
Figure 26:
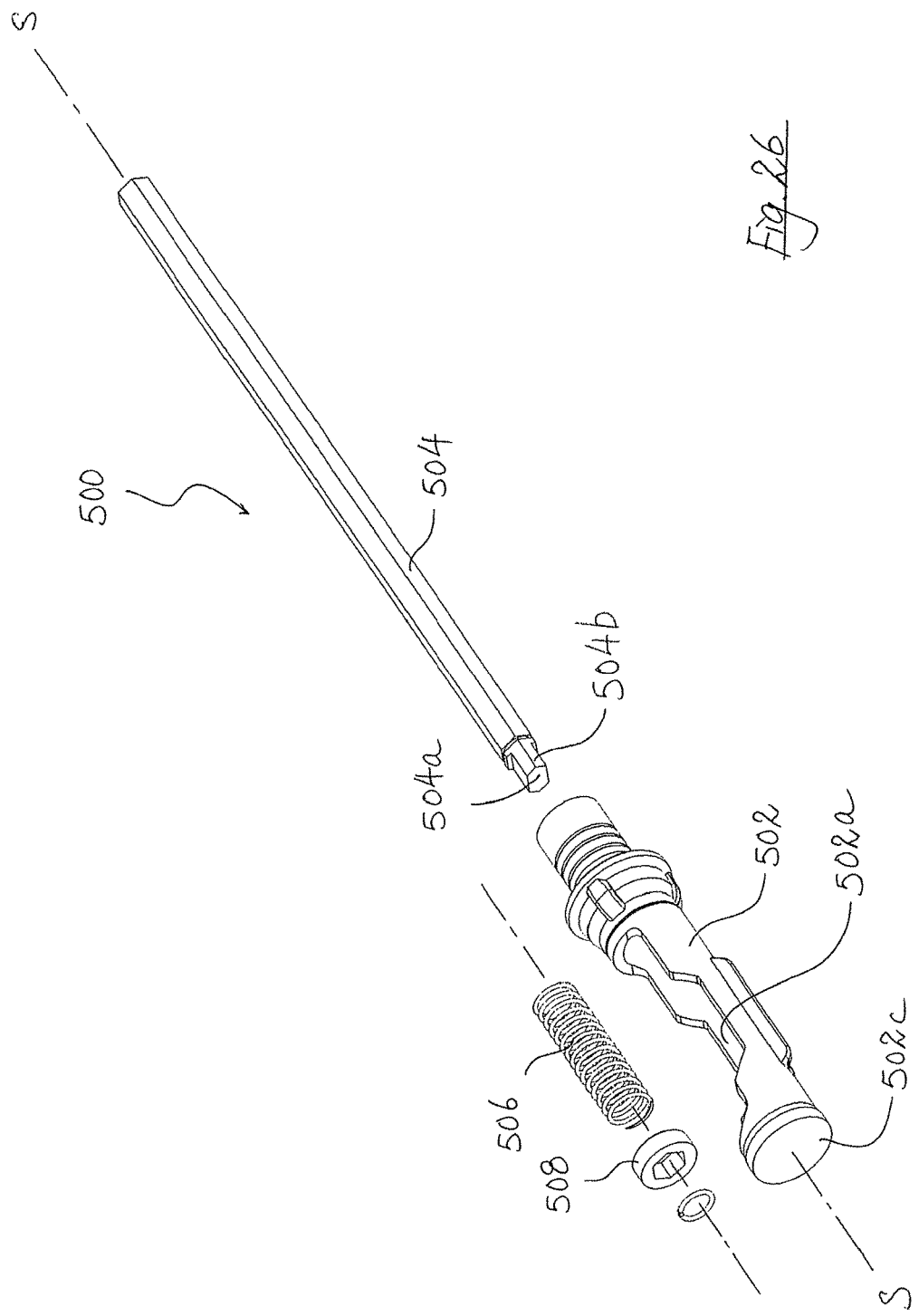
FIG. 26 is an exploded view of the accessory of FIG. 25.

A still further accessory for an electric power tool (such as an electric drill) according to the present invention is shown in FIGS. 25 and 26, and generally designated as 500. The accessory 500 includes a plug cartridge 502 and a rod 504 telescopically engaged with each other for relative sliding movement. The rod 504 is engaged with the plug cartridge 502 via a spring 506 and a locking ring 508. The plug cartridge 502 is slidable relative to the rod 504 between a contracted position in which a front longitudinal end 504a of the rod 504 touches an inner surface of a front longitudinal end of the plug cartridge 502 and an extended position in which the front longitudinal end 504a of the rod 504 is out of contact with the inner surface of the front longitudinal end of the plug cartridge 502 to expose an internal cavity 502a of the plug cartridge 52 to the outside environment.

This accessory 500 is (fixedly or releasably) attached to an engagement part (such as one similar to the tool engagement part 304 discussed above) for releasable engagement with an electric power tool, e.g. an electric drill (not shown). In particular, the engagement part has a collar which engages a front cylindrical portion of the electric drill such that, when the electric drill is engaged with the accessory 500 via the engagement part, the axis of rotation of the drill bit installed to the electric drill is parallel to a longitudinal axis S-S of the accessory 500. It can be seen that the plug cartridge 502 is slidable relative to the rod 504 along the axis S-S.

To set a maximum depth of drill equalling to a length of a plug to be inserted into the hole formed by an electric drill in a workpiece (e.g. a wall or ceiling) with the accessory 500, the electric drill is firstly engaged with the accessory 500 via an engagement part by having a cylindrical front part of the electric drill engaged with the engagement part such that the axis of rotation of the drill bit installed to the electric drill lies on an axis parallel to the axis S-S.

The plug cartridge 502 is then moved away from the rod 504 to expose the internal cavity 502a of the plug cartridge 502 to the outside environment. The internal cavity 502a is sized and shaped to allow insertion of a plug into the internal cavity 502a.

A plug P is then loaded into the internal cavity 502a of the plug cartridge 502, such that a rear end of the plug P contacts the front longitudinal end 504a of the rod 504 and a front end of the plug P contacts the inner surface of the front longitudinal end of the plug cartridge 502. The position of the accessory 500 relative to the engagement part is adjusted by moving the accessory 500 axially relative to the engagement part until an outer front longitudinal end 502c of the plug cartridge 502 is co-terminus with the free end of the drill bit of the electric drill. Put another way, the position of the accessory 500 is adjusted such that (a) its longitudinal axis S-S is parallel to the axis of rotation of the drill bit of the electric drill and (b) the free end of the drill bit of the electric drill and the outer front longitudinal end 502c of the plug cartridge 502 lie on a line perpendicular to the axis S-S.

The plug P is then removed from the plug cartridge 502, whereupon the plug cartridge 502 is moved back to the contracted position. In this situation, the outer front longitudinal end 502c of the plug cartridge 502 is not co-terminus with the front end of the drill bit, but is retracted with respect to the front end of the drill bit. The distance between the front longitudinal end 502c of the plug cartridge 502 and a line passing through the front end of the drill bit and perpendicular to the axis S-S is thus the length of the plug P and is also the set depth of drill.

When drilling, the drill bit of the electric drill drills into a workpiece, but cannot enter further when the outer front longitudinal end 502c of the plug cartridge 502 contacts the surface of the workpiece, thus signifying that the set depth of drill has been reached.

The inner surface of the front longitudinal end of the plug cartridge 502 is formed with a recess (not shown) shaped and sized to receive a reduced head 504b of the rod 504. The recess is of a depth of around 7 mm. On the other hand, the plug P cannot be received within the recess. By way of such an arrangement, when using this accessory 500, the maximum length of a hole allowed to be drilled into a workpiece is the length of the plug P plus the depth of the recess, such as 7 mm. The purpose of such an arrangement is to ensure that the depth of the hole drilled is slightly longer than the length of the plug P, such that the plug P can be fully received within the hole.

Figure 27:
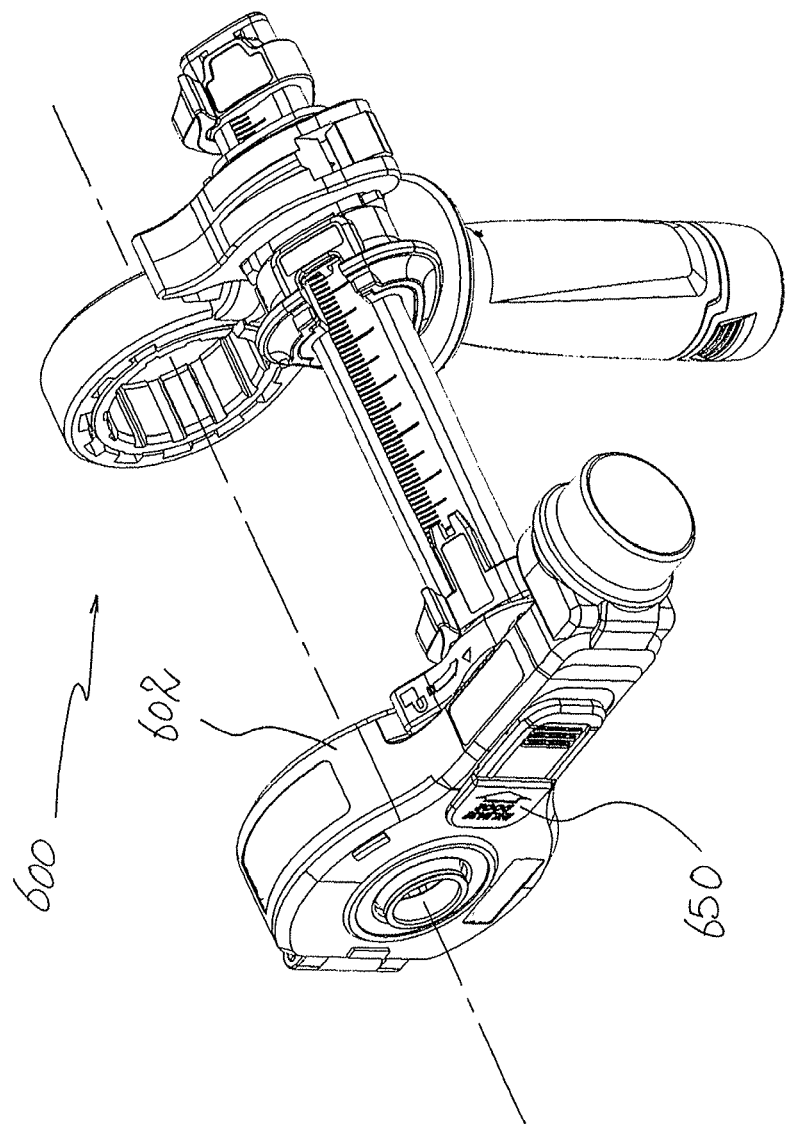
FIG. 27 is a front perspective view showing a yet further accessory according to the present invention.
Figure 28:
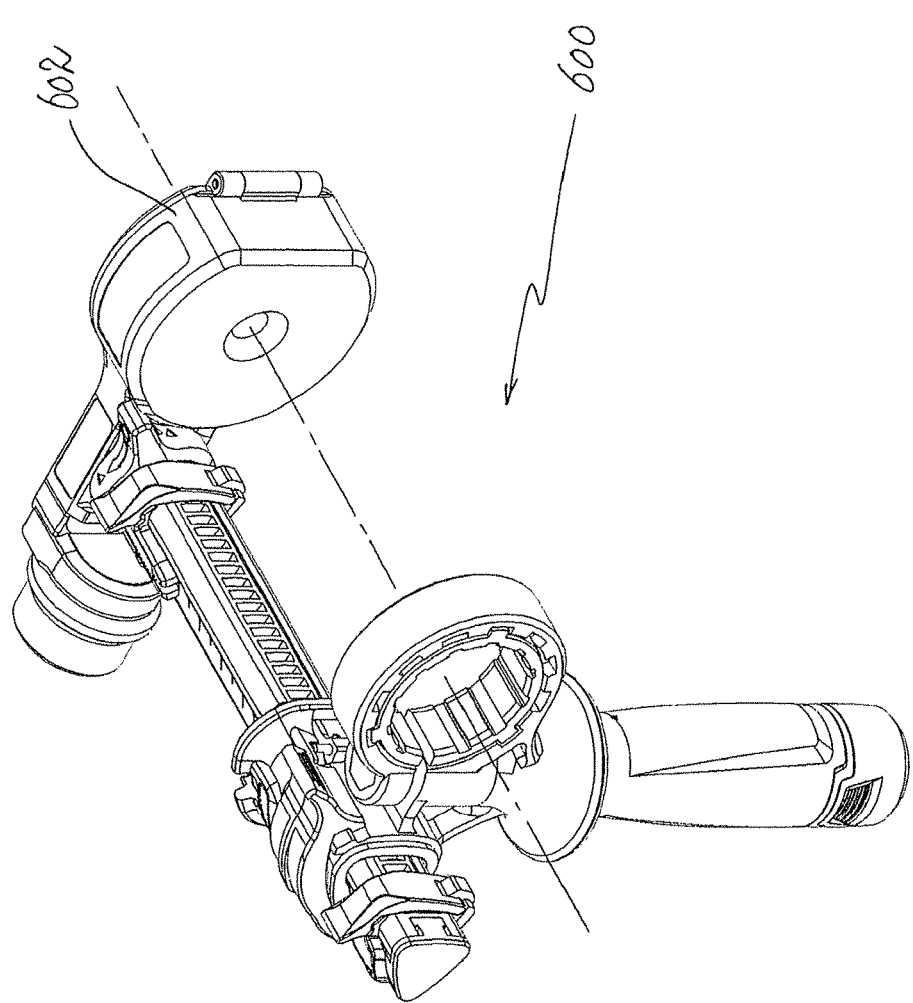
FIG. 28 is a rear perspective view of the accessory shown in FIG. 27.
Figure 29:
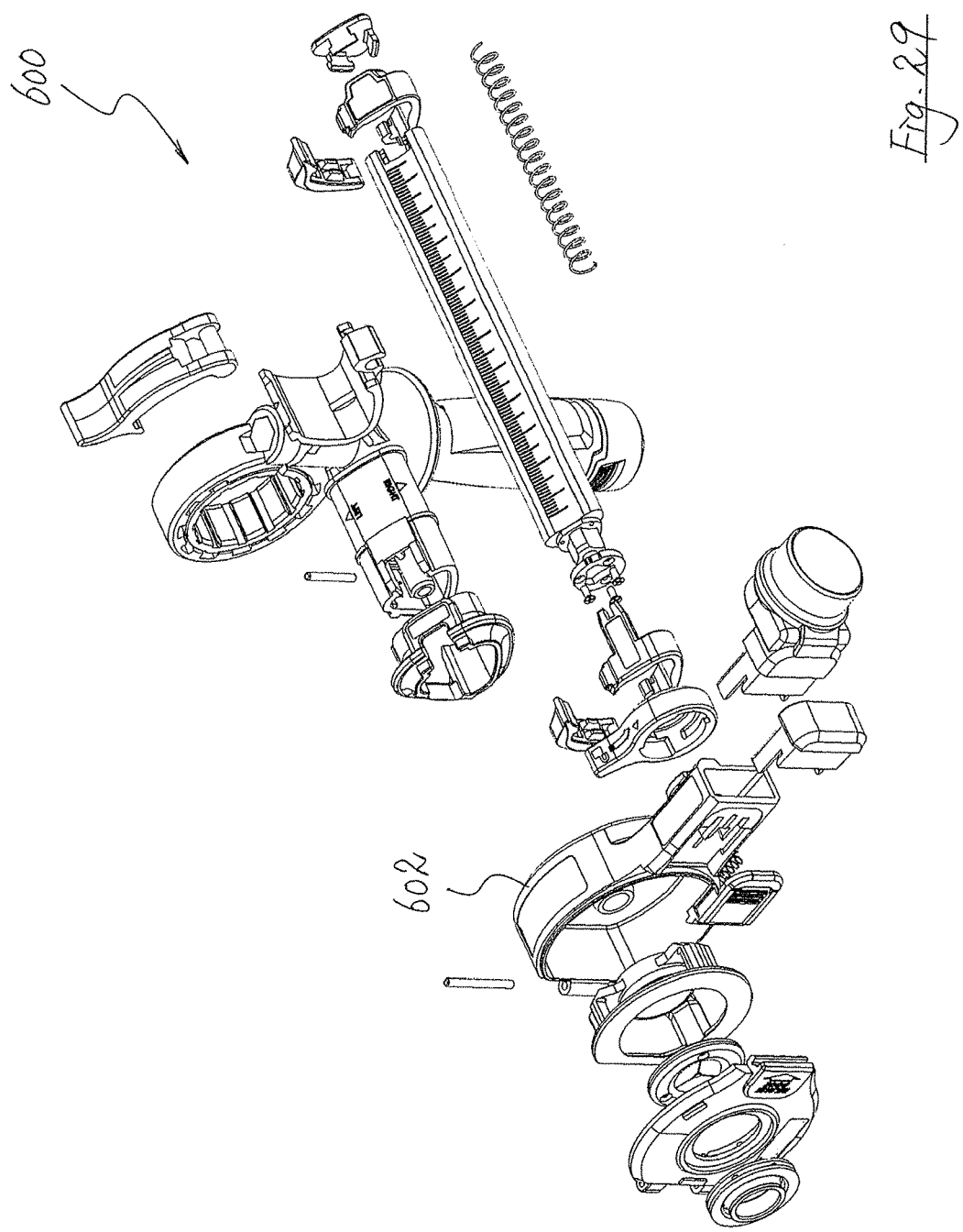
FIG. 29 is an exploded view of the accessory shown in FIG. 27.

A yet further accessory according to the present invention is shown in FIGS. 27 to 29 and generally designated as 600. As a major difference between this accessory 600 and the accessories 100, 200 discussed above resides in a dust catcher 602 of the accessory 600, the dust catcher 602 is discussed in more detail below.

Figure 30:
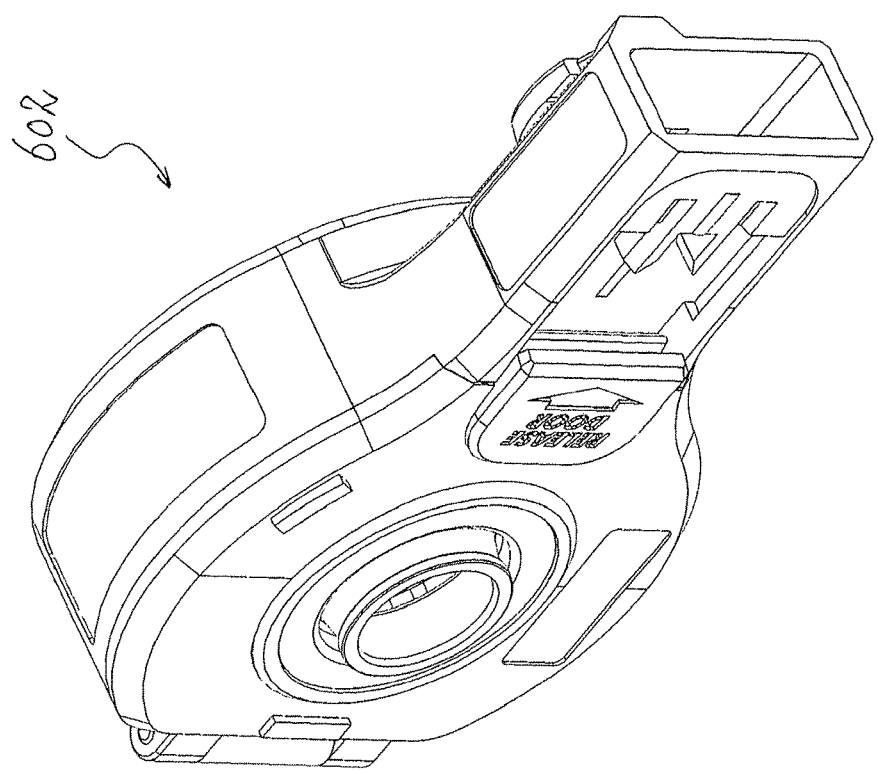
FIG. 30 is an enlarged front perspective view of the dust catcher of the accessory shown in FIG. 27.
Figure 31:
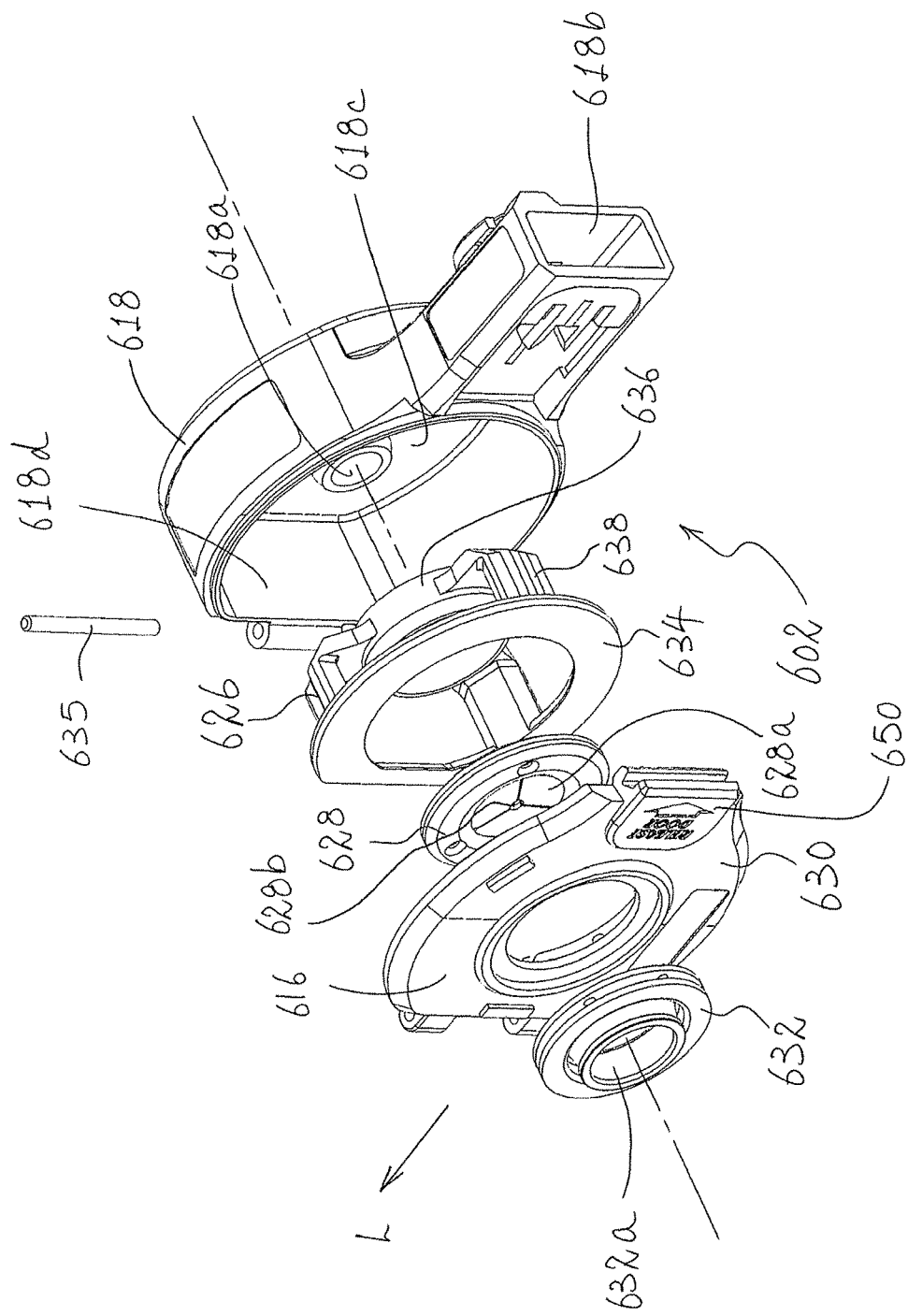
FIG. 31 is an exploded view of the dust catcher shown in FIG. 30.
Figure 32:
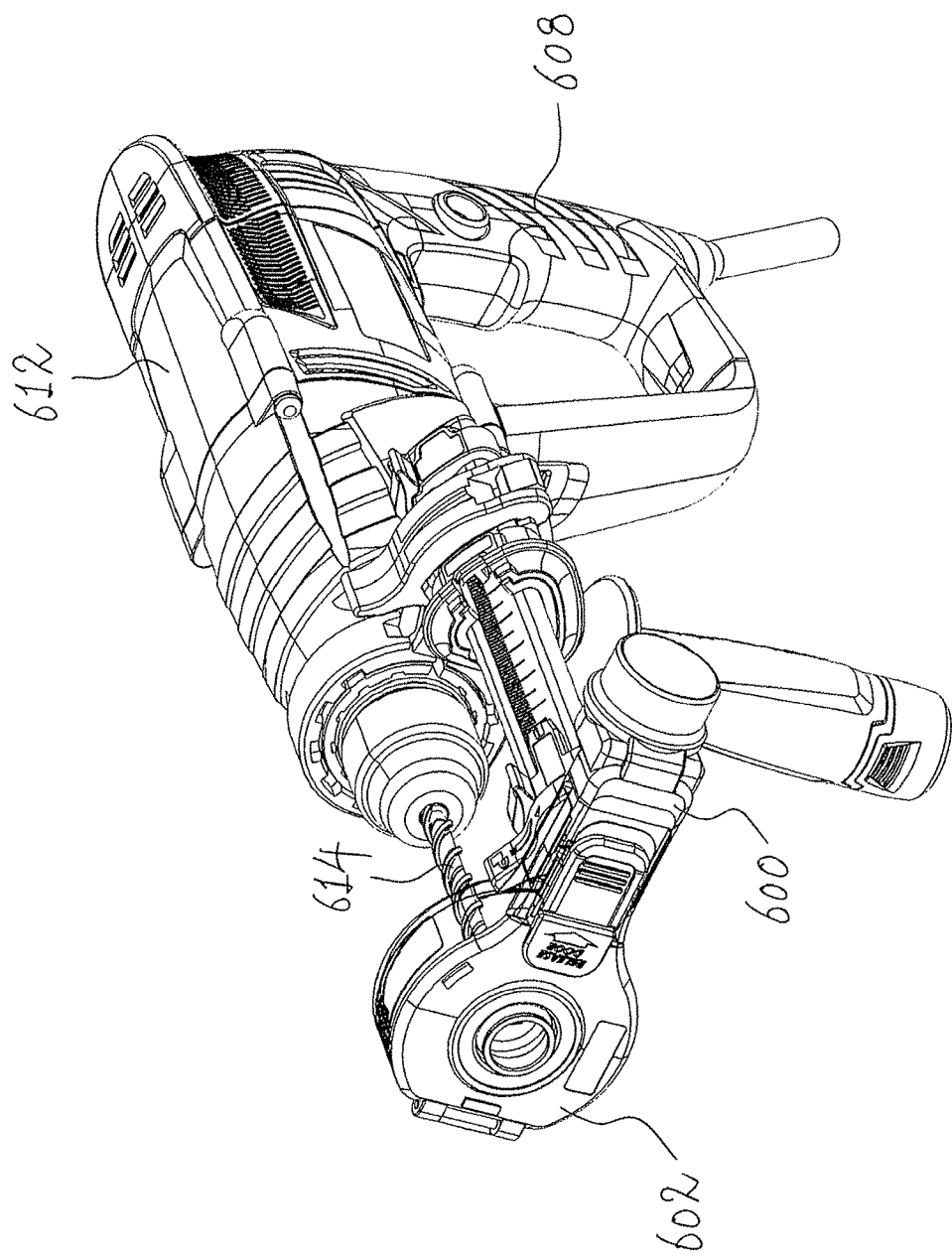
FIG. 32 is a perspective view showing the accessory of FIG. 27 engaged with an electric drill.
Figure 33:
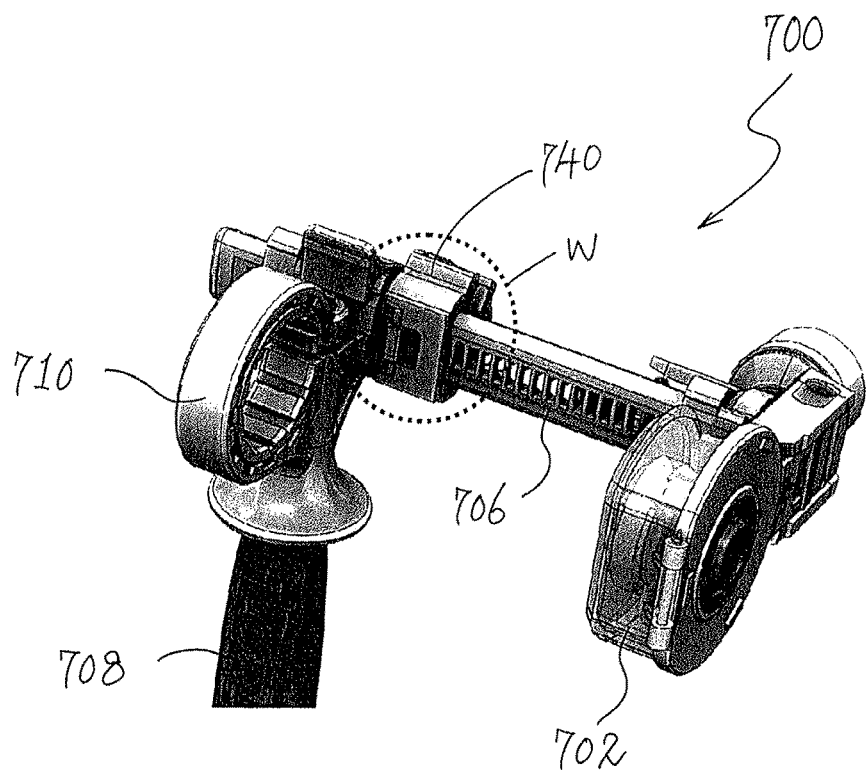
FIG. 33 is a partial perspective view of a still further accessory according to the present invention.

As shown in FIGS. 30 and 31, the dust catcher 602 is shown as including a dust box 618 for receiving abraded materials produced by an electric drill on a workpiece, e.g. a wall, a ceiling, or a piece of metal. The dust box 618 is transparent to allow easy observation of its internal cavity. The dust catcher 602 also includes a mounting frame 626, a disc 628, a dust box cap 630 with an outer longitudinal end 616, and a rubber seal 632. The dust box cap 630 and the dust box 618 are pivotally movable relative to each other about a spindle 635. The mounting frame 626, disc 628, dust box cap 630 and rubber seal 632 are generally cylindrical or annular in shape, each having a respective central longitudinal through hole. When the dust catcher 602 is properly assembled, a lower surface of the dust box 618 constitutes a longitudinal end of the dust catcher 602 which is opposite to the outer longitudinal end 616. A drill bit 114 may be received through the holes of all these components (all aligned with one another along a common longitudinal axis), with the free end of a drill bit 614 (see FIG. 32) of an electric drill 612 entering the dust catcher 602 through an opening 618a of the dust box 618 and exiting the dust catcher 602 through an opening 632a of the rubber seal 632.

The mounting frame 626 has an upper rim 634 and a lower rim 636 joined with each other by a number of ribs 638. The upper rim 634 of the mounting frame 626 is fixedly engaged with a lower surface of the dust box cap 630 to form a confined space containing the disc 628. The disc 628 is sized and shaped to be freely movable within the confined space between the mounting frame 626 and the dust box cap 630. The disc 628 has three sections 628a formed around a central opening 628b. The dust box 618 has an opening 618b for connection with a suction source (e.g. a vacuum cleaner) to allow sucking out of the content in the dust catcher 602.

When the dust catcher 602 is duly assembled, and when the drill bit 614 of the electric drill 612 is received into the internal cavity of the dust catcher 602 through the opening 618a of the dust box 618, the drill bit 614 is received through the opening 628b of the disc 628. The drill bit 614 is thus releasably engaged with the disc 628 via the central opening 628b. Upon rotation of the drill bit 614 about its own central longitudinal axis of rotation, the drill bit 614 is frictionally engaged with the disc 628, so that the disc 628 is brought into simultaneous corresponding rotational movement about its own longitudinal axis, which coincides with the central longitudinal axis of rotation of the drill bit 614.

During drilling operation, the outer longitudinal end 616 of the dust catcher 602 is moved to abut a surface of the workpiece (e.g. a wall or a ceiling) to be drilled. Upon activation of the drill 612, the drill bit 614 is caused to rotate and the user pushes a handle 608 of the drill 612 to cause the drill 612 to move towards the dust catcher 602, whereupon a length of the drill bit 614 will extend through the opening of the outer longitudinal end 616 of the dust catcher 602 and drill into the workpiece. During rotation of the drill bit 614, the disc 628 will be brought into simultaneous rotational movement about the central longitudinal axis of rotation of the drill bit 614. In addition, as the disc 628 is only frictionally engaged with the drill bit 614, the drill bit 614 may move axially relative to the disc 628, towards and away from the dust catcher 602.

It is found in practice that, with such an arrangement, when using the electric drill 612 engaged with the accessory 600 to drill a hole into a ceiling, dust or other materials produced by the drilling operation which falls into the dust catcher 602 through the opening 632a of the rubber seal 632 will drop on an inner lower surface 618c of the dust box 618. Only a very small proportion of such dust and abraded materials will fall onto a user of the electric drill 612 through the opening 618a of the dust box 618, as a very large proportion of such dust and abraded materials will be forced by the rotating disc 628 to move, transverse to the longitudinal axis of rotation of the disc 628 and towards side walls 618d of the dust box 618, and to deposit on the inner lower surface 618c of the dust box 618, for subsequent disposal. When in the configuration shown in FIG. 27, the dust box cap 630 is locked by a lock 650 to the dust box 618. If desired, the lock 650 (which is carried by the dust box cap 630) may be moved in the direction indicated by the arrow L in FIG. 31 to unlock the dust box cap 630 from the dust box 618, so as to allow the dust box cap 630 to pivot relative to and away from the dust box 618 to allow the content in the dust box 618 to be cleared out. The dust box cap 630 may then be pivoted back to the closed configuration shown in FIG. 27 and the lock 650 be moved in a direction opposite to that shown by the arrow L to lock the dust box cap 630 against movement relative to the dust box 618.

A further accessory according to the present invention, being a modification to the accessories 100, 200 and 600 disclosed above, is shown in FIGS. 33 to 37 and generally designated as 700. As a major difference between this accessory 700 and the accessories 100, 200, 600 discussed above resides in a sliding lock 740 of the accessory 700 for setting the maximum distance through which a handle 708 and an annular collar 710 (which are engaged with each other for simultaneous movement) are movable along a rail 706 relative to a dust catcher 702 (thus setting the maximum depth of drilling of an electric drill releasably engaged with the accessory 700), the sliding lock 740 is discussed in more detail below.

Figure 34:
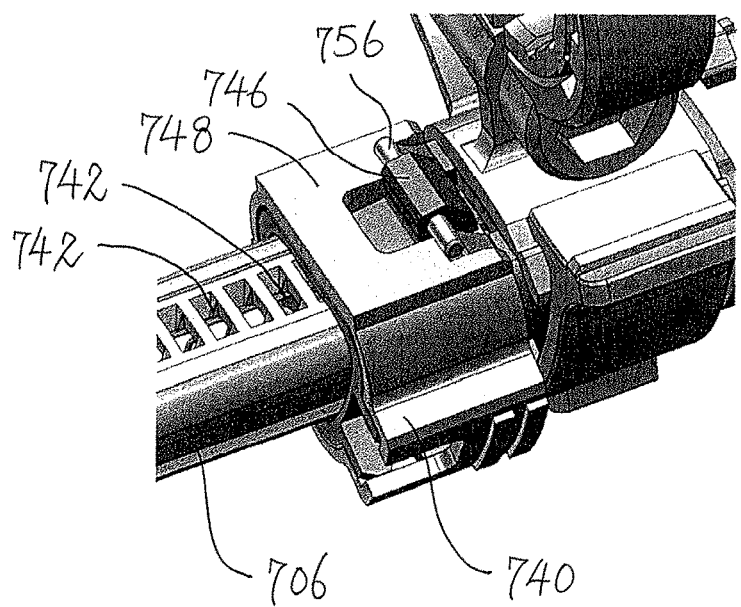
FIG. 34 is an enlarged view of the encircled part W shown in FIG. 33, with an auto-locking sliding lock in an unlocked configuration.
Figure 35:
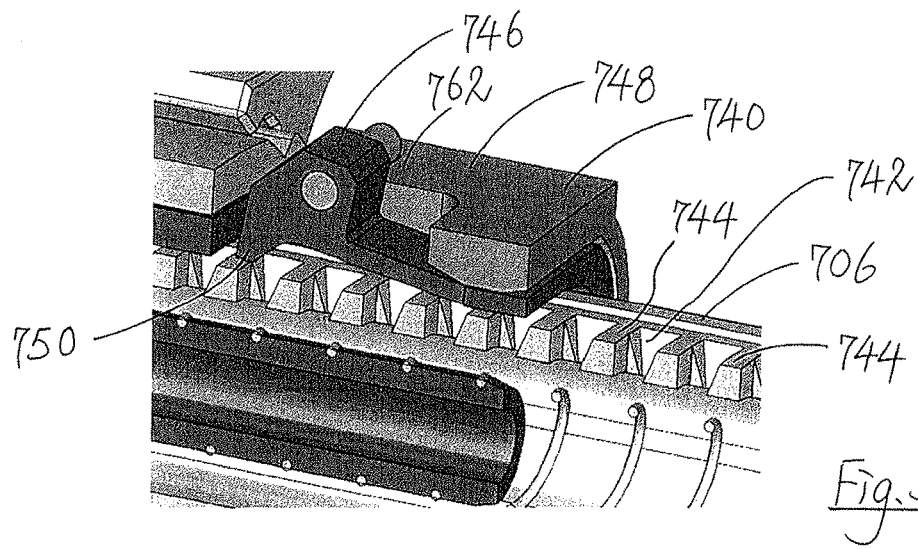
FIG. 35 is a sectional view of the auto-locking sliding lock shown in FIG. 34.

As shown in FIGS. 34 and 35, the sliding lock 740 is mounted on the rail 706 for sliding movement along and relative to the rail 706. The rail 706 has a row of recesses 742 defined by a row of successive teeth 744. The sliding lock 740 has a lock part 746 and a body part 748 which are slidingly movable relative to each other. The sliding lock 740 is shown in FIGS. 34 and 35 as in an unlocked configuration, in which a lock tip 750 of the lock part 746 of the sliding lock 740 is raised above the recesses 742, thus allowing the sliding lock 740 (including both the lock part 746 and the body part 748) to be slid along and relative to the rail 706.

Figure 36:
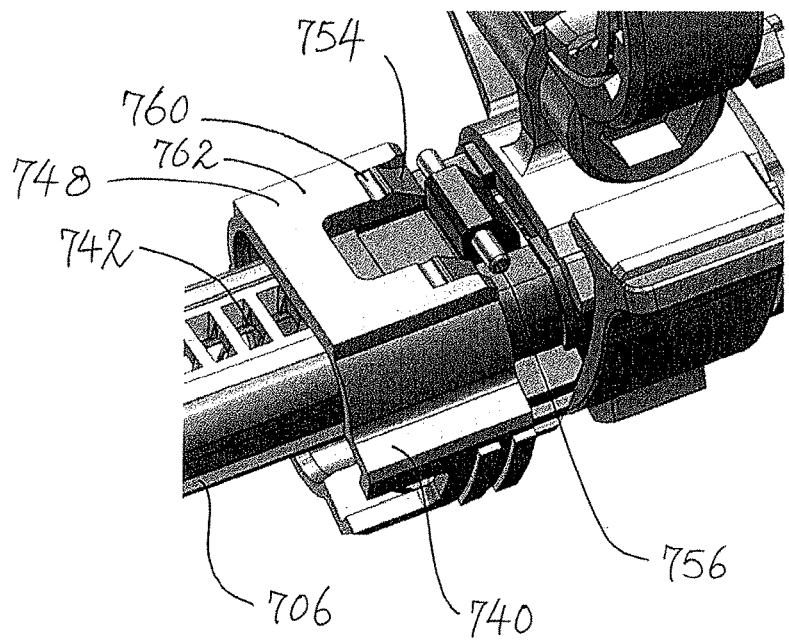
FIG. 36 is an enlarged view of the encircled part W shown in FIG. 33, with an auto-locking sliding lock in a locking configuration.
Figure 37:
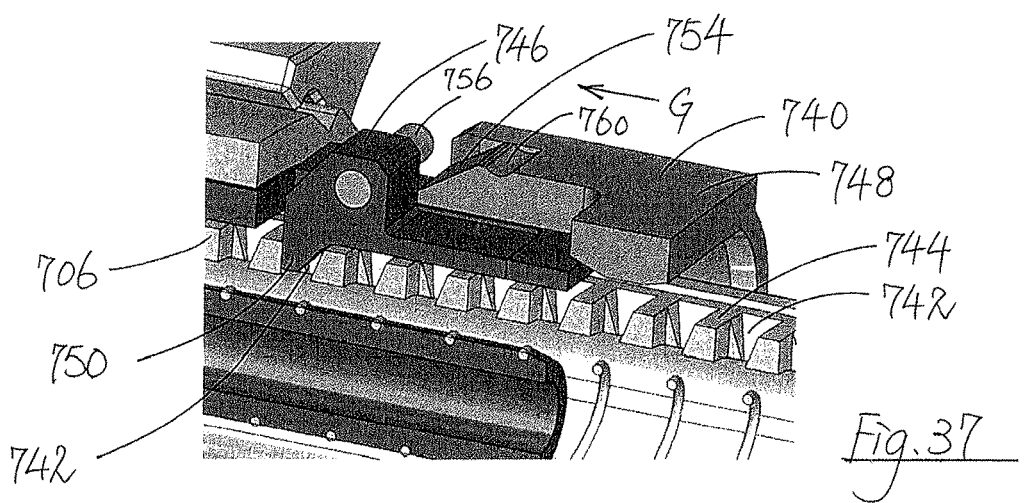
FIG. 37 is a sectional view of the auto-locking sliding lock shown in FIG. 36.

Turning to FIGS. 36 and 37, such show the sliding lock 740 in a locking configuration, in which the lock tip 750 of the lock part 746 of the sliding lock 740 is received within one of the recesses 742, whereby the sliding lock 740 (including both the lock part 746 and the body part 748) is locked against movement relative to the rail 706.

Starting from the locking configuration shown in FIGS. 36 and 37, if a user would like to unlock the sliding lock 740, he/she is to move the body part 748 towards the lock part 746 (i.e. in the direction indicated by the arrow G in FIG. 37). Such a movement brings two ramps 754 of the body part 748 each into contact with a respective pin 756 fixedly engaged with the lock part 746. Further movement of the body part 748 towards the lock part 746 will cause the pins 756 to travel upwardly along the ramps 754 to raise the lock tip 750 out of engagement with the recess 742, until each of the pins 756 is received within a respective trough 760 on an upper platform 762 of the body part 746. The sliding lock 740 is now in the unlocked configuration shown in FIGS. 34 and 35.

If, for example, after sliding the sliding lock 740 to another position along the rail 706, the user now would like to return the sliding lock 740 to the locking configuration so as to lock the sliding lock 740 against movement relative to the rail 706, he/she is to dislodge the pins 756 from the troughs 760 by sliding the body part 748 away from the lock part 746 in a direction opposite to the direction indicated by the arrow G in FIG. 37. During such relative movement, under the biasing force caused by the resilience of the lock part 746, the pins 756 of the lock part 746 travel downwardly along the ramps 754 until the lock tip 750 is received within one of the recesses 742. The sliding lock 740 is now in the unlocked configuration shown in FIGS. 36 and 37. It should be understood that, due to the resilience of the lock part 746, the lock part 746 is biased towards the configuration in which the lock tip 750 is engaged with one of the recesses 742 of the rail 706.

It should be understood that the above only illustrates and describes examples whereby the present invention may be carried out, and that modifications and/or alterations may be made thereto without departing from the spirit of the invention. For example, although the inventions have thus far been discussed in the context of accessories for electric drills, it is envisaged that the accessories may be used for other electric power tools.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. An accessory for an electric power tool, said accessory including
    a housing for receiving abraded materials produced by an electric power tool on a workpiece,
    means for releasably engaging said accessory with said electric power tool,
    means for setting the maximum distance through which said engaging means is movable relative to said housing, and
    a rail member with at least one recess,
    wherein said setting means is movable between a locking configuration in which said setting means is locked against movement relative to said rail member and an unlocked configuration in which said setting means is movable relative to said rail member,
    wherein said setting means includes a body part and a lock part which are slidingly movable relative to each other to move said setting means between said locking configuration and said unlocked configuration, wherein when said setting means is in said locking configuration, a locking element of said lock part is at least partly received within said recess of said rail member to prevent relative movement between said setting means and said rail member, and when said setting means is in said unlocked configuration, said locking element of said lock part is moved by said body part out of engagement with said recess of said rail member to allow said setting means to slide relative to said rail member.

2. An accessory according to claim 1 wherein said lock part is resilient.

3. An accessory according to claim 1 wherein said lock part is biased towards a configuration in which said locking element is engaged with said recess of said rail member.

4. An accessory according to claim 1 wherein said body part includes at least one trough for receiving at least one pin portion of said lock part when said setting means is in said unlocked configuration.

5. An accessory according to claim 4 wherein said body part includes at least one ramp portion along which said at least one pin portion travels during movement of said setting means between said unlocked configuration and said locking configuration.

* * * * *